(12) United States Patent
Tamayama et al.

(10) Patent No.: US 9,628,766 B2
(45) Date of Patent: Apr. 18, 2017

(54) DISPLAY DEVICE, IMAGE PROCESSING DEVICE AND IMAGE PROCESSING METHOD, AND COMPUTER PROGRAM

(71) Applicant: Sony Corporation, Tokyo (JP)

(72) Inventors: Ken Tamayama, Tokyo (JP); Akira Fujinawa, Kanagawa (JP); Masayuki Shimizu, Kanagawa (JP); Kiyoshi Ikeda, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/378,840

(22) PCT Filed: Dec. 17, 2012

(86) PCT No.: PCT/JP2012/082620
§ 371 (c)(1),
(2) Date: Aug. 14, 2014

(87) PCT Pub. No.: WO2013/125138
PCT Pub. Date: Aug. 29, 2013

(65) Prior Publication Data
US 2015/0009416 A1 Jan. 8, 2015

(30) Foreign Application Priority Data

Feb. 22, 2012 (JP) ................................. 2012-036407

(51) Int. Cl.
*H04N 9/31* (2006.01)
*H04N 5/64* (2006.01)
(Continued)

(52) U.S. Cl.
CPC ......... *H04N 9/3185* (2013.01); *G02B 27/017* (2013.01); *G02B 27/0172* (2013.01);
(Continued)

(58) Field of Classification Search
USPC ............................................ 348/746, 51, 54
See application file for complete search history.

(56) References Cited

U.S. PATENT DOCUMENTS

| 4,636,869 | A | * | 1/1987 | Tomohisa et al. ........ G06T 3/40 358/296 |
| 5,369,450 | A | * | 11/1994 | Haseltine et al. ....... H04N 9/28 315/368.12 |

(Continued)

FOREIGN PATENT DOCUMENTS

| CN | 101163236 A | 4/2008 |
| CN | 101166288 A | 4/2008 |

(Continued)

OTHER PUBLICATIONS

International Search Report from International Publication PCT/JP2012/082620 mailed Feb. 26, 2013.

(Continued)

*Primary Examiner* — Paulos M Natnael
(74) *Attorney, Agent, or Firm* — Lerner, David, Littenberg, Krumholz & Mentlik, LLP

(57) ABSTRACT

Provided is a display device including an image display unit configured to display an image with a plurality of pixels arranged on a display surface, an eyepiece optical unit configured to project the display surface of the image display unit in a manner that a predetermined angle of view is obtained, and an image correction unit configured to correct a display image on the display surface at a position of each of representative pixels which are discretely located on the display surface, on the basis of distortion generated due to the eyepiece optical unit.

10 Claims, 30 Drawing Sheets

(51) Int. Cl.
*G02B 27/01* (2006.01)
*H04N 13/04* (2006.01)
*H04N 5/14* (2006.01)
*G09G 5/00* (2006.01)
*G09G 5/391* (2006.01)
*G09G 3/00* (2006.01)

(52) U.S. Cl.
CPC ............ *G09G 5/005* (2013.01); *H04N 5/145* (2013.01); *H04N 5/64* (2013.01); *H04N 9/3129* (2013.01); *H04N 13/0468* (2013.01); *G02B 2027/011* (2013.01); *G02B 2027/014* (2013.01); *G09G 3/002* (2013.01); *G09G 5/391* (2013.01); *G09G 2340/04* (2013.01)

(56) References Cited

U.S. PATENT DOCUMENTS

| | | | | |
|---|---|---|---|---|
| 6,058,212 | A * | 5/2000 | Yokoyama | H04N 19/54 348/699 |
| 6,188,800 | B1 | 2/2001 | Okitsu | |
| 6,215,461 | B1 * | 4/2001 | Ishibashi | G02B 27/017 345/8 |
| 6,597,411 | B1 * | 7/2003 | Selby et al. | G09G 1/285 348/607 |
| 8,130,261 | B2 | 3/2012 | Trudeau et al. | |
| 8,659,508 | B2 | 2/2014 | Todoroki | |
| 2006/0002694 | A1 * | 1/2006 | Mihara | G02B 15/173 396/72 |
| 2006/0072215 | A1 * | 4/2006 | Nishi | G02B 13/06 359/708 |
| 2006/0187503 | A1 * | 8/2006 | Ahn | H04N 1/40068 358/482 |
| 2006/0204138 | A1 * | 9/2006 | Yim | G06T 3/4007 382/298 |
| 2008/0089611 | A1 | 4/2008 | McFadyen et al. | |
| 2008/0247462 | A1 * | 10/2008 | Demos | H04N 19/597 375/240.03 |
| 2008/0316146 | A1 | 12/2008 | Todoroki | |
| 2009/0179824 | A1 | 7/2009 | Tsujimoto et al. | |
| 2011/0122299 | A1 * | 5/2011 | Tatsuzawa | H04N 5/367 348/246 |
| 2012/0026368 | A1 * | 2/2012 | Cote | G06T 3/4015 348/242 |
| 2012/0044387 | A1 * | 2/2012 | Usami | H04N 5/3572 348/240.3 |
| 2012/0113278 | A1 * | 5/2012 | Okada | H04N 5/217 348/208.4 |
| 2012/0218322 | A1 * | 8/2012 | Shiomi | G02F 1/36286 345/690 |
| 2014/0111532 | A1 * | 4/2014 | Manchi | G06T 3/4007 345/582 |
| 2016/0078599 | A1 * | 3/2016 | Furihata et al. | G06F 3/14 345/667 |

FOREIGN PATENT DOCUMENTS

| | | | |
|---|---|---|---|
| JP | 5-176216 | A | 7/1993 |
| JP | 8-205181 | A | 8/1996 |
| JP | 9-200770 | A | 7/1997 |
| JP | 10-74077 | A | 3/1998 |
| JP | 10-74078 | A | 3/1998 |
| JP | 2001069434 | A | 3/2001 |
| JP | 3-212762 | B | 7/2001 |
| JP | 2002-006220 | A | 1/2002 |
| JP | 2002-296673 | A | 10/2002 |
| JP | 2004-236191 | A | 8/2004 |
| JP | 2006-074805 | A | 3/2006 |
| JP | 2008-103978 | A | 5/2008 |
| JP | 2008-258802 | A | 10/2008 |
| JP | 2009-005235 | A | 1/2009 |
| JP | 2010252290 | A | 11/2010 |

OTHER PUBLICATIONS

Partial European Search Report for EP Application No. 12869246A, dated Oct. 5, 2015.
Extended European Search Report for EP12869246.4 Dated Jan. 21, 2016.
Japanese Office Action for Application No. 2014500879, dated May 10, 2016.
Japanese Office Action for Application No. 2014500879, dated Nov. 22, 2016.
Chinese Office Action for Application No. 201280069909.1 dated Feb. 3, 2017.

* cited by examiner

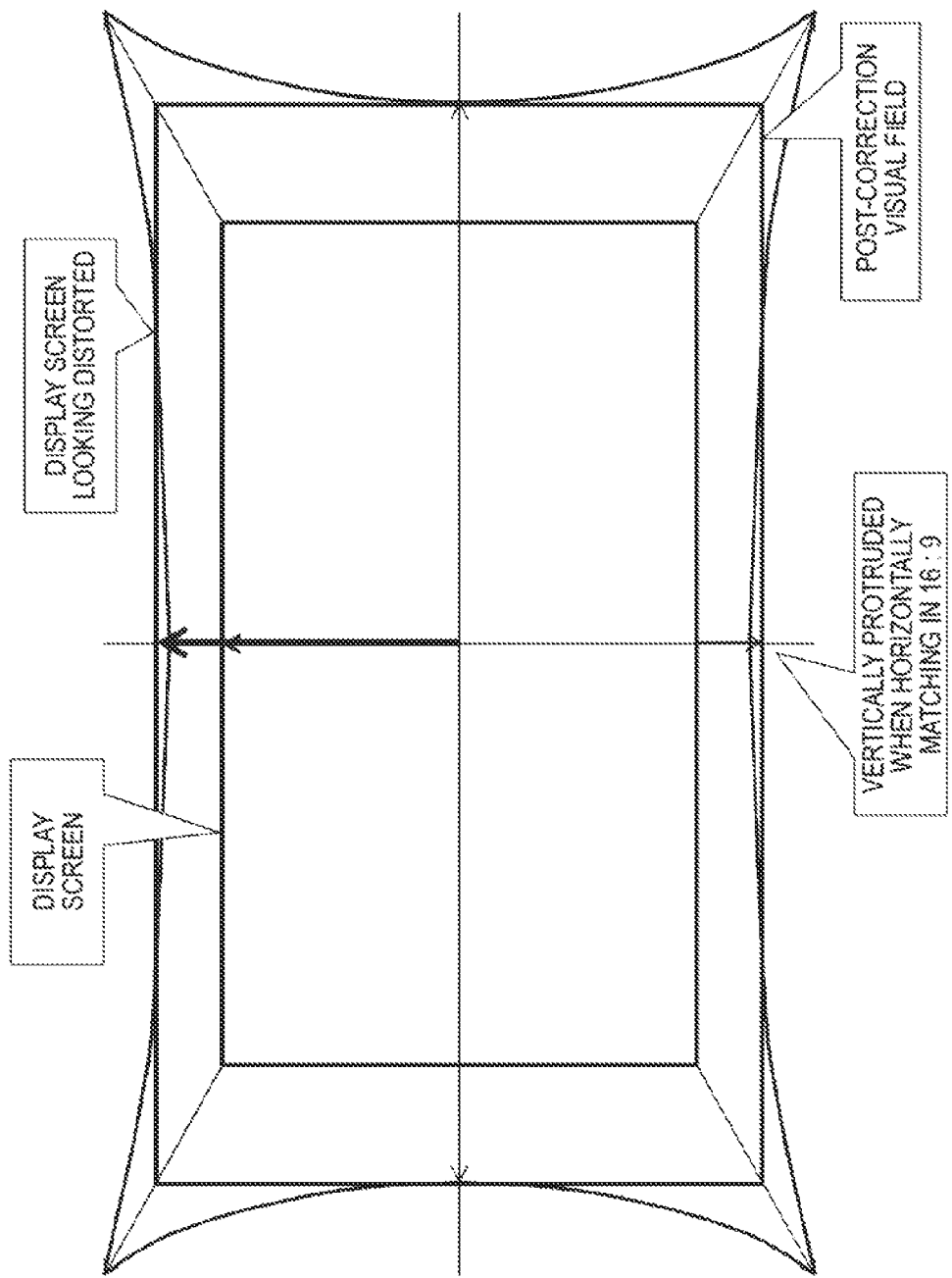

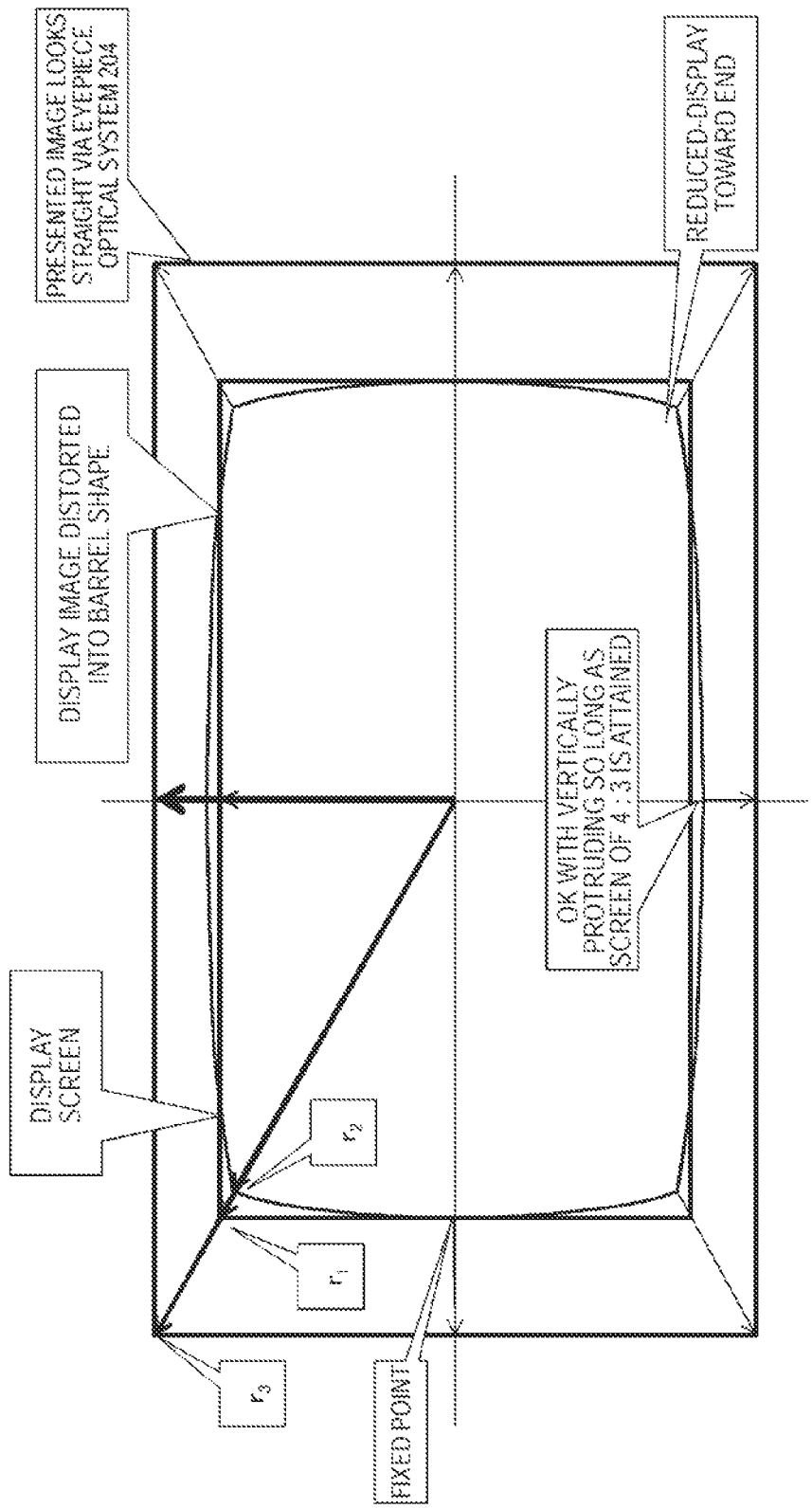

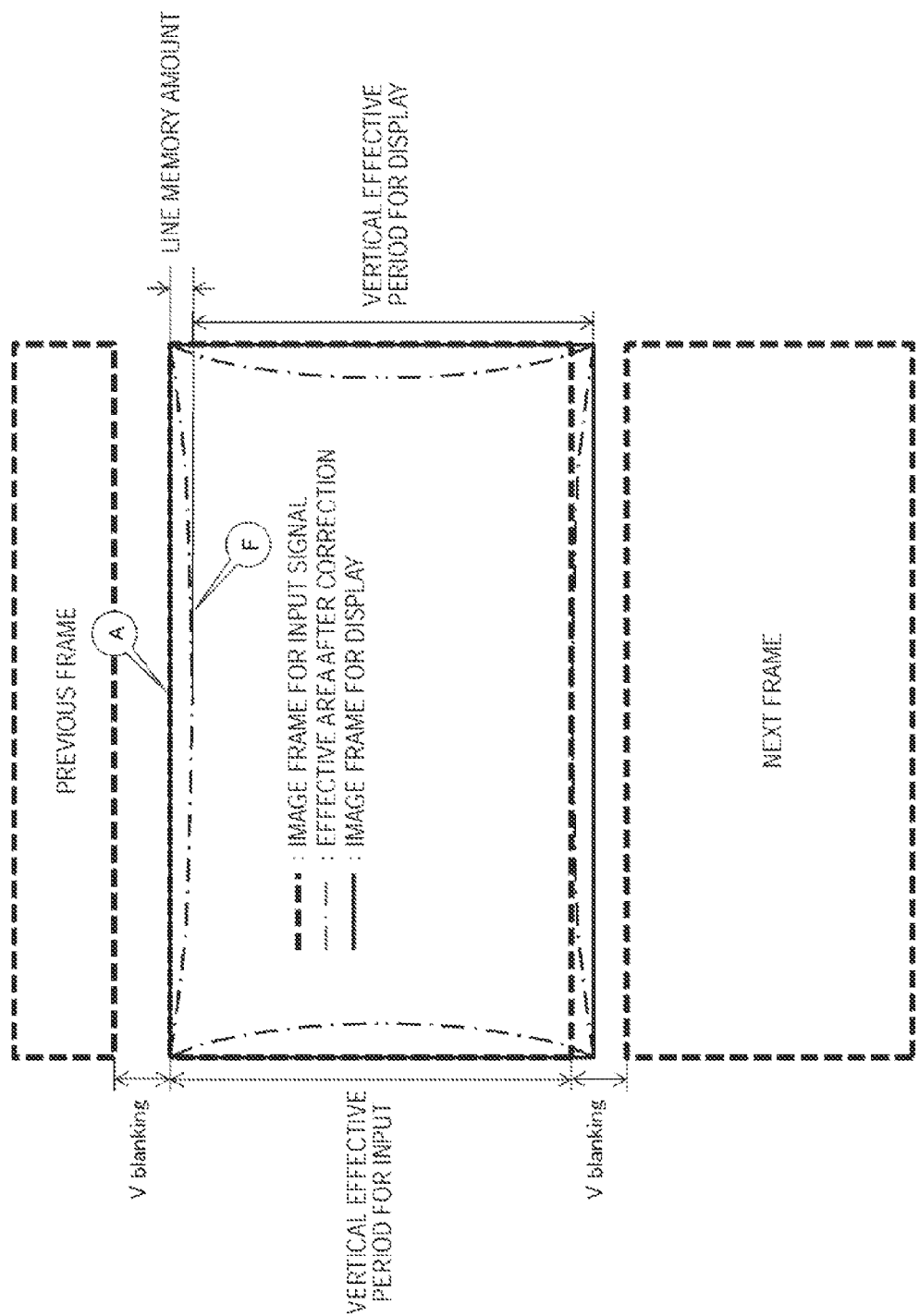

DISPLAY DEVICE, IMAGE PROCESSING DEVICE AND IMAGE PROCESSING METHOD, AND COMPUTER PROGRAM

CROSS-REFERENCE TO RELATED APPLICATION

The present application is a national phase entry under 35 U.S.C. §371 of International Application No. PCT/JP2012/082620 filed Dec. 17, 2012, published on Aug. 29, 2013 as WO 2013/125138A1, which claims priority from Japanese Patent Application No. JP 2012-036407, filed in the Japanese Patent Office on Feb. 22, 2012.

TECHNICAL FIELD

A technology disclosed in the present description relates to a display device worn on a head of a user to serve for viewing an image, an image processing device and an image processing method, and a computer program.

BACKGROUND ART

A display device which is worn on a head for viewing images, in other words, a head-mount display (HMD), has been widely known. Such a head-mount display is configured to have optical units each for the left and right eyes, and to be able to control the senses of viewing and hearing by also using a headphone. If such a device is configured to completely block the outside world when mounted on a head, a feeling of virtual reality during viewing increases. In addition, as a head-mount display can also project different images to the right and left eyes, 3D images can be presented when images having parallax are displayed for the right and left eyes.

For a display unit of a head-mount display for the right and left eyes, high-definition image display elements which include, for example, liquid crystal or organic EL (Electro-Luminescence) elements, or the like can be used. In addition, if a wide angle of view is set by enlarging and projecting image display elements with an eyepiece optical system, and multi-channels are realized using a headphone, a rich feeling of presence in a movie theater for viewing and listening can be reproduced.

An optical lens has been known to have distortion. For example, if the angle of view is taken in the head-mount display, complex distortion and color deviation are generated in an observed image caused by distortion of the lens used in the eyepiece optical system, and thus, there is concerned that quality is deteriorated.

If the number of lenses constituting the eyepiece optical system is increased in order to ensure the wide angle of view, the weight of the head-mount display is increases so that more burdens are imposed on the user wearing the head-mount display. Here, if the number of lenses is decreased for weight saving, the distortion generated in each lens is enlarged and a system for correcting the distortion is lost. As a result, the angle of view is difficult to be widely taken.

There has been known a method for correcting the distortion generated in the eyepiece optical system by a signal process. For example, there has been proposed a display device in which a size of the image to be displayed on the image display elements is varied for each wavelength such that chromatic aberration of magnification generated in an optical system is cancelled in advance, and therefore, the observed image can be observed as if with no chromatic aberration of magnification (e.g., see Patent Literature 1).

This display device compensates a phenomenon in a positive lens system that since the longer wavelength a light ray has, the weaker a refractive index, and the shorter wavelength the light ray has, the stronger the refractive power, an image of a red color having the long wavelength is observed small and an image of a blue color having the short wavelength is observed widely. In short, in this display device, an image having sizes different for each color is passed through an optical system having the chromatic aberration of magnification such that light fluxes of respective colors are made to approximately coincide one another at an incident position on an eyeball in the case of the eyepiece optical system and at an incident potion on a screen or the like in the case of a projection optical system, and therefore, the observed image can be observed as if with no chromatic aberration of magnification.

However, the distortion generated in the image upon passing through the eyepiece optical system is not limited to simple one due to the differences in the refractive powers depending on the wavelength. Simply varying the size of the image (display ratio) for each wavelength (a color of long wavelength is displayed smaller than a color of short wavelength) cannot eliminate an image distortion due to a complex phenomenon such as a lens distortion.

Examples of another signal processing method for correcting the distortion generated in the eyepiece optical system include address translation. In other words, a distorted image is moved to an ideal image position on the basis of a correspondence relationship between an image location obtained by an ideal optical system and an image location affected by an actual aberration. Here, in a case where an image size is large or high translation accuracy is required, disadvantageously a size of a correction table storing a correspondence relationship with coordinates after translation is bloated. For example, there has been proposed a method in which, by use of a feature that the distortion in the optical system is point-symmetric with respect to an image (rotationally symmetric with respect to an optical axis), not a correction data for an entire image but a correction data for an area of half or quarter of the image is used also for other symmetric area (e.g., see Patent Literatures 2 and 3). However, the size of the correction table may be reduced with assumption that the display image distortion is rotationally symmetric with respect to the optical axis. In other words, this cannot be applied to the distortion which is not rotationally symmetric with respect to the optical axis.

Further, there has been proposed an image display system which includes an image display device having the eyepiece optical system and a control device outputting to an image display device an image signal containing distortion inverse to optical distortion which is generated in the image due to the eyepiece optical system, and in which the control device side stores reference data as representative correction data calculated from a design value or the like, the image display device side stores difference data as the correction data corresponding to an individual difference of the optical system, and the control device uses the reference data and the difference data to generate the image signal containing the inverse distortion (e.g., see Patent Literature 4). According to this image display system, amounts of the correction data stored respectively in the control device and the image display device can be reduced and a time for the control device to read the correction data from image display device can be reduced. However, it is remained that the correction data for the entire image is held.

CITATION LIST

Patent Literature

Patent Literature 1: JP 3212762B
Patent Literature 2: JP H5-176216A
Patent Literature 3: JP H8-205181A
Patent Literature 4: JP 2008-258802A

SUMMARY OF INVENTION

Technical Problem

An object of the technology disclosed in the present description is to provide an excellent display device which is worn on a head of a user to serve for viewing an image and can display a clear image at a wide angle of view by enlarging and projecting by use of the eyepiece optical system, an image processing device and an image processing method, and a computer program.

An another object of the technology disclosed in the present description is to provide an excellent display device which can display a clear image at a wide angle of view by eliminating affection of the lens distortion involved in the eyepiece optical system, an image processing device and an image processing method, and a computer program.

Solution to Problem

The present application takes the above-described problems into consideration. According to the present technology, there is provided a display device including an image display unit configured to display an image with a plurality of pixels arranged on a display surface, an eyepiece optical unit configured to project the display surface of the image display unit in a manner that a predetermined angle of view is obtained, and an image correction unit configured to correct a display image on the display surface at a position of each of representative pixels which are discretely located on the display surface, on the basis of distortion generated due to the eyepiece optical unit.

According to the technology of the present application, the image correction unit of the display device includes a motion vector holding part configured to hold a motion vector expressing the distortion generated due to the eyepiece optical unit at the position of the representative pixel, a vector interpolation part configured to interpolate a motion vector at a position of each pixel other than the representative pixel on the basis of the motion vectors of one or more representative pixels in the neighborhood, and a pixel correction part configured to provide, by use of the motion vector, distortion in a direction opposite to the distortion generated due to the eyepiece optical unit to each pixel on the display surface and to correct the pixel.

According to the technology of the present application, the display device further includes an optical simulator configured to trace a light ray of the display image in the image display unit passing through the eyepiece optical unit, and a vector generation part configured to generate the motion vector at the position of the representative pixel on the basis of light ray trace data obtained by the optical simulator.

According to the technology of the present application, the display device further includes a vector generation part generating the motion vector at the position of the representative pixel by actually shooting a virtual image projected by the eyepiece optical unit when the representative pixel is made to be lighted.

According to the technology of the present application, in the display device, the image display unit has the display surface vertically longer compared with an aspect ratio of the display image, the eyepiece optical unit generates a substantially pin-cushion shaped distortion, and the image correction unit corrects the display image in a manner that an angle of view at a horizontal end is not changed.

According to the technology of the present application, the pixel correction part of the display device separates pixel correction in a vertical direction and pixel correction a horizontal direction and performs a pixel correction process in series for each direction.

According to the technology of the present application, the pixel correction part of the display device moves the pixel in the same vertical line for each line to perform correction in a vertical direction and then subsequently moves the pixel in the same horizontal line for each line to perform correction in a horizontal direction.

According to the technology of the present application, the pixel correction part of the display device finds the motion vector in the horizontal direction at a position moved by an amount of the motion vector in the vertical direction.

According to the technology of the present application, the display device further includes a modulation part configured to shift the position of the display image at low frequency. The image correction unit corrects the display image having been subjected to a modulation process by the modulation part while shifting a correspondence relationship a pixel position and the motion vector. The image display unit has a function to shift a display position for burn-in prevention. The shift of the image correction unit and the shift of the image display unit are made to operate in conjunction with each other.

According to the technology of the present application, the display device further includes a scaling part configured to scale the display image in conformity to the number of pixels of the display surface of the image display unit. The image correction unit corrects the display image on a line memory. The image display unit drives at a timing for making a size of the line memory minimum.

According to the technology of the present application, there is provided an image processing device including a motion vector holding part configured to hold a motion vector expressing distortion generated when an eyepiece optical unit projects a display surface in a manner that a predetermined angle of view is obtained, at a position of each of representative pixels which are discretely located on the display surface having a plurality of pixels arranged thereon, a vector interpolation part configured to interpolate a motion vector at a position of each pixel other than the representative pixel on the basis of the motion vectors of one or more representative pixels in the neighborhood, and a pixel correction part configured to provide, by use of the motion vector, distortion in a direction opposite to the distortion generated due to the eyepiece optical unit to each pixel on the display surface and to correct the pixel.

According to the technology of the present application, there is provided an image processing method including a motion vector holding step of holding a motion vector expressing distortion generated when an eyepiece optical unit projects a display surface in a manner that a predetermined angle of view is obtained, at a position of each of representative pixels which are discretely located on the display surface having a plurality of pixels arranged thereon, a vector interpolation step of interpolating a motion vector at a position of each pixel other than the representative pixel on the basis of the motion vectors of one or more representative pixels in the neighborhood, and a pixel correction step of providing, by use of the motion vector, distortion in a direction opposite to the distortion generated due to the eyepiece optical unit to each pixel on the display surface and of correcting the pixel.

According to the technology of the present application, there is provided a computer program described in a computer-readable form, the computer program causing a computer to function as an image display unit configured to display an image with a plurality of pixels arranged on a display surface, an eyepiece optical unit configured to project the display surface of the image display unit in a manner that a predetermined angle of view is obtained, and an image correction unit configured to correct a display image on the display surface at a position of each of representative pixels which are discretely located on the display surface, on the basis of distortion generated due to the eyepiece optical unit.

A computer program according to the technology of the present application defines a computer program described in a computer-readable form such that a predetermined process is achieved on a computer. In other words, a cooperative operation is exerted on the computer by installing in the computer the computer program according to the technology of the present application so as to be able to obtain an operation effect similar to the display device described above of the present application.

Advantageous Effects of Invention

According to the technology disclosed in the present description, it is possible to provide an excellent display device which is worn on a head of a user to serve for viewing an image and can display a clear image at a wide angle of view by enlarging and projecting by use of the eyepiece optical system, an image processing device and an image processing method, and a computer program.

According to the technology disclosed in the present description, it is possible to provide an excellent display device which can display a clear image at a wide angle of view by correcting distortion generated in the display image due to the eyepiece optical system or the like on the basis of less correction data, an image processing device and an image processing method, and a computer program.

Other objects, features, and advantages of the present description will be further apparent with detailed description based on later-mentioned embodiments of the present description and attached drawings.

BRIEF DESCRIPTION OF DRAWINGS

FIG. 16A is a diagram showing a virtual image in a case of designing an eyepiece optical system 204 such that the pin-cushion distortion is to be generated.

FIG. 16B is a diagram showing a result of correcting a display image having the pin-cushion distortion shown in FIG. 16A.

FIG. 31 is a diagram for explaining an estimation of a capacity of the line memory 1902 the image correction unit 202 has to have.

DESCRIPTION OF EMBODIMENTS

Hereinafter, a preferred embodiment of the present description will be described in detail with reference to the appended drawings. Note that, in this specification and the drawings, elements that have substantially the same function and structure are denoted with the same reference signs, and repeated explanation is omitted.

Figure 1:
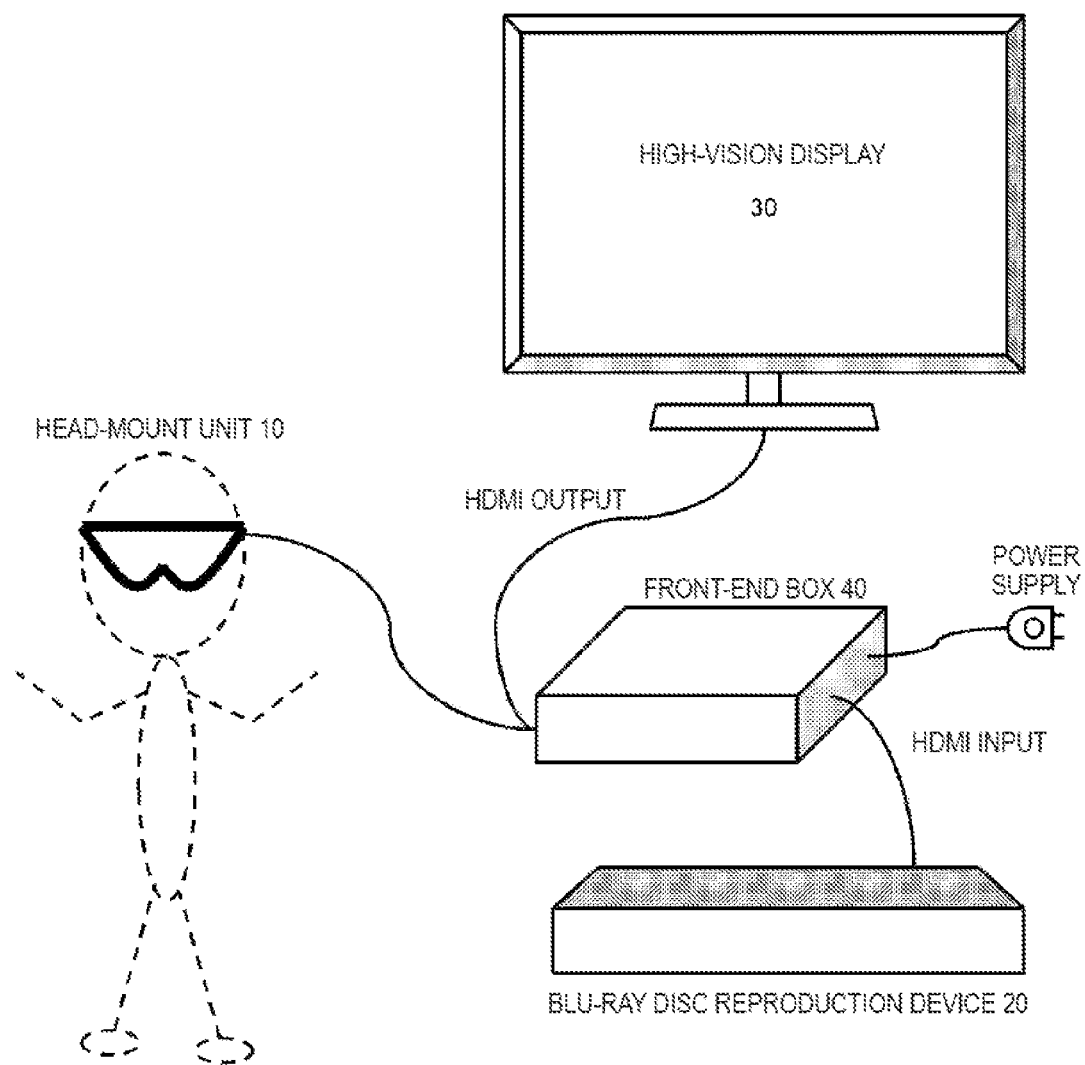
FIG. 1 is an illustration schematically showing a configuration of an image display system including a head-mount display.

FIG. 1 schematically shows a configuration of an image display system including a head-mount display. The system shown in the drawing is constituted by a Blu-ray disc reproduction device 20 that serves as a source of viewing content, a front-end box 40 that processes AV signals output from the Blu-ray disc reproduction device 20, a head-mounting type display device (head-mount unit) 10 that is an output destination of reproduced content of the Blu-ray disc reproduction device 20, and a high-vision display (for example, an HDMI-compatible television) 30 that is another output destination of the Blu-ray disc reproduction device 20. One head-mount display is configured by the head-mount unit 10 and the front-end box 40.

The front-end box 40 corresponds to an HDMI repeater that, for example, processes AV signals output from the Blu-ray disc reproduction device 20 and outputs the signals to an HDMI port when an HDMI input of the AV signals is received. In addition, the front-end box 40 is a 2-output switcher that switches the output destination of the Blu-ray disc reproduction device 20 to any one of the head-mount unit 10 or the high-vision display 30. The front-end box 40 has two outputs in the example of the drawing, but may have three or more outputs. However, the front-end box 40 has an exclusive output destination of AV signals, and puts priority on output to the head-mount unit 10.

Note that HDMI (High-Definition Multimedia Interface) is an interface standard for digital home appliances mainly for transmitting sounds and videos based on DVI (Digital Visual Interface) using TMDS (Transition Minimized Differential Signaling) in a physical layer. The present system is based on, for example, an HDMI 1.4 specification.

The Blu-ray disc reproduction device 20 and the front-end box 40, and the front-end box 40 and the high-vision display 30 are respectively connected to each other with HDMI cables. The front-end box 40 and the head-mount unit 10 can also be configured to be connected with an HDMI cable, but AV signals may be serially transmitted therebetween using a cable of other specifications. However, AV signals and power may be set to be supplied to one cable connecting the front-end box 40 and the head-mount unit 10, and the head-mount unit 10 can obtain drive power via the cable.

The head-mount unit 10 has independent display units for the left eye and the right eye. Each of the display units uses organic EL elements, for example. In addition, each of the left and right display units is equipped with a high-definition eyepiece optical system which causes low distortion and has a wide viewing angle. If a wide angle of view is set by enlarging and projecting image display elements with the eyepiece optical system, and multi-channels are realized using a headphone, a rich feeling of presence in a movie theater for viewing and listening can be reproduced.

Figure 5:
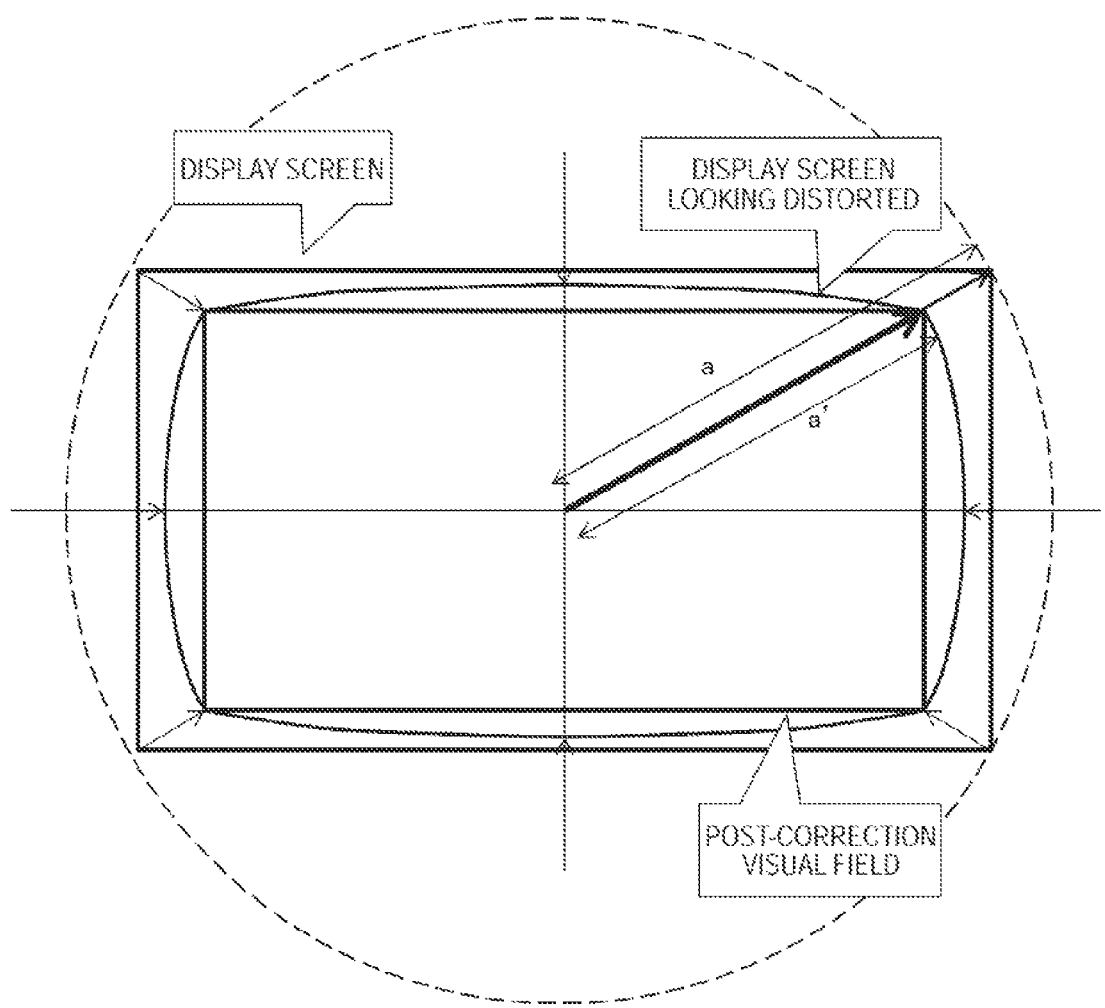
FIG. 5 is a diagram illustrating a barrel distortion generated in the presented image due to the eyepiece optical system.

Here, there is concerned that distortion is generated in an observed image caused by the distortion of the lens used in the eyepiece optical system. There can be cited as a typical exemplary observed image "pin-cushion distortion" in which four corners of a screen are outwardly distorted as show in FIG. 3, and "barrel distortion" in which four corners of the screen are expanded as shown in FIG. 5.

Figure 3:
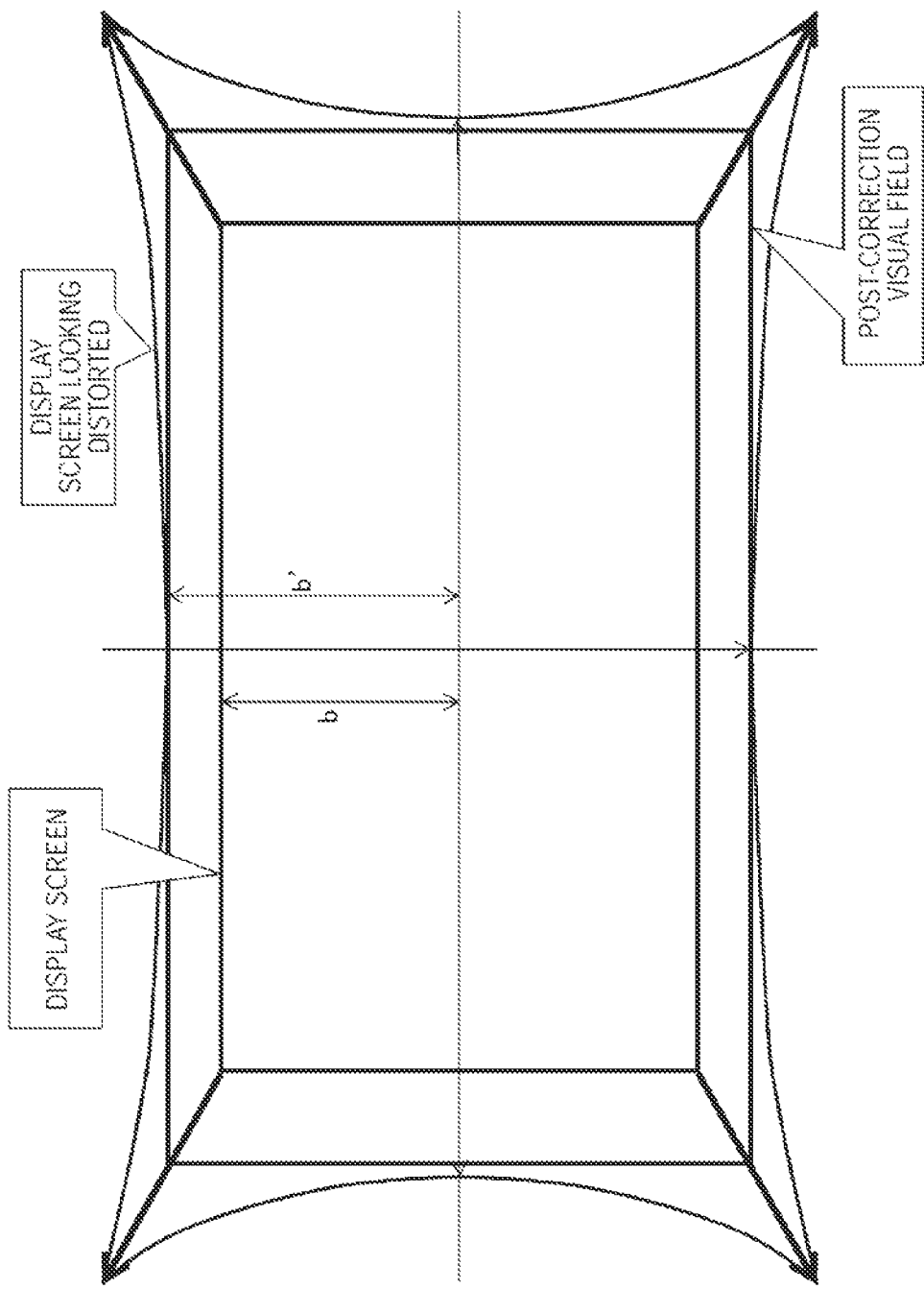
FIG. 3 a diagram illustrating a pin-cushion distortion generated in a presented image due to the eyepiece optical system.

In the case of the pin-cushion distortion, the angle of view is b'/b as shown in FIG. 3. As shown in a formula (1) below, since $D_b>0$ holds, the angle of view is widened.

[Math 1]

$$D_b = 100 \times \frac{b' - b}{b} \tag{1}$$

$$\frac{b'}{b} = 1 + \frac{D_b}{100}$$

On the other hand, in the case of the barrel distortion, the angle of view is a'/a as shown in FIG. 5. As shown in a formula (2) below, since $D_a<0$ holds, the angle of view is narrowed.

[Math 2]

$$D_a = 100 \times \frac{a' - a}{a} \tag{2}$$

$$\frac{a'}{a} = 1 + \frac{D_a}{100}$$

The observed image distortion as shown in FIG. 3 or FIG. 5 can be corrected by an optical system. However, in accordance with this method, there is concern about burden which is to be imposed on a user wearing the head-mount unit 10 of which weight is increased since a lens for distortion correction is added. Therefore, the embodiment adopts a method for correcting the distortion generated in the eyepiece optical system by a signal process.

Figure 2:
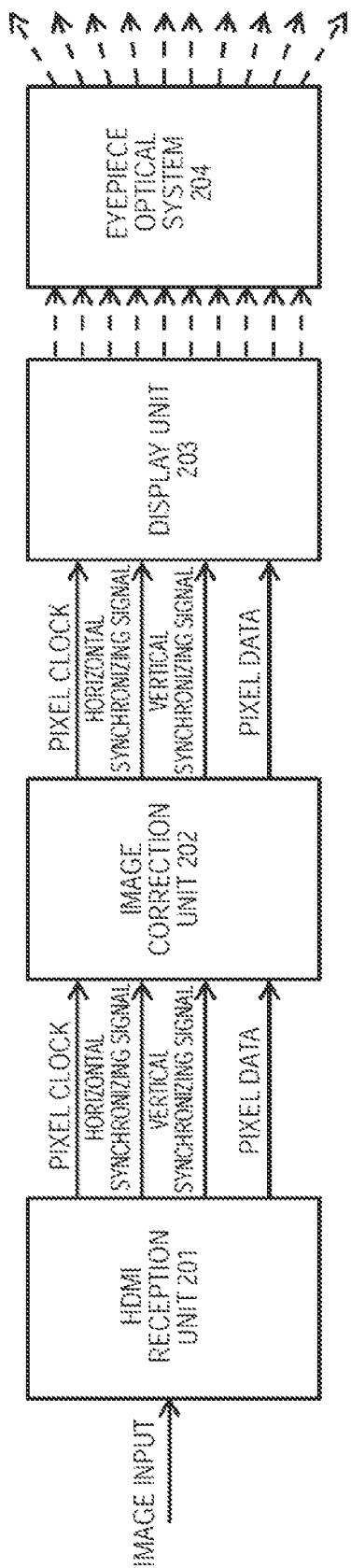
FIG. 2 is a functional block diagram illustrating correction by a signal process of distortion which is generated in a projection image of an eyepiece optical system in the head-mount display.

The signal process as used herein corresponds to a process of giving, to a presented image, distortion in a direction opposite to the distortion generated in the projection image of an eyepiece optical system. FIG. 2 shows a functional block diagram illustrating correction by the signal process of the distortion which is generated in the projection image of the eyepiece optical system in the head-mount display. An HDMI reception unit 201 receives the presented image from an image source such as the Blu-ray disc reproduction device 20. An image correction unit 202 gives distortion in a direction opposite to the distortion generated in the eyepiece optical system 204 to the presented image. A display unit 203 includes organic EL elements and the like and displays on the screen the presented image having been corrected by the image correction unit 202 with the distortion in the opposite direction. The display image on the screen is projected to a retina of an observer' eye through the eyepiece optical system 204. When a light of the display image passes through the eyepiece optical system 204, the distortion is generated, in the direction opposite to which distortion the display image is given the distortion, and thus, a normal virtual image with no distortion is formed on the retina.

The image correction unit 202 may be arranged either in the head-mount unit 10 or the front-end box 40. With taking into account that an image distortion is corrected on the basis of a distortion parameter held by the eyepiece optical system 204 in the head-mount unit 10, if the image correction unit 202 is arranged in the head-mount unit 10, the front-end box 40 side can output the image signal regardless of which head-mount unit 10 is an output destination.

Figure 4:
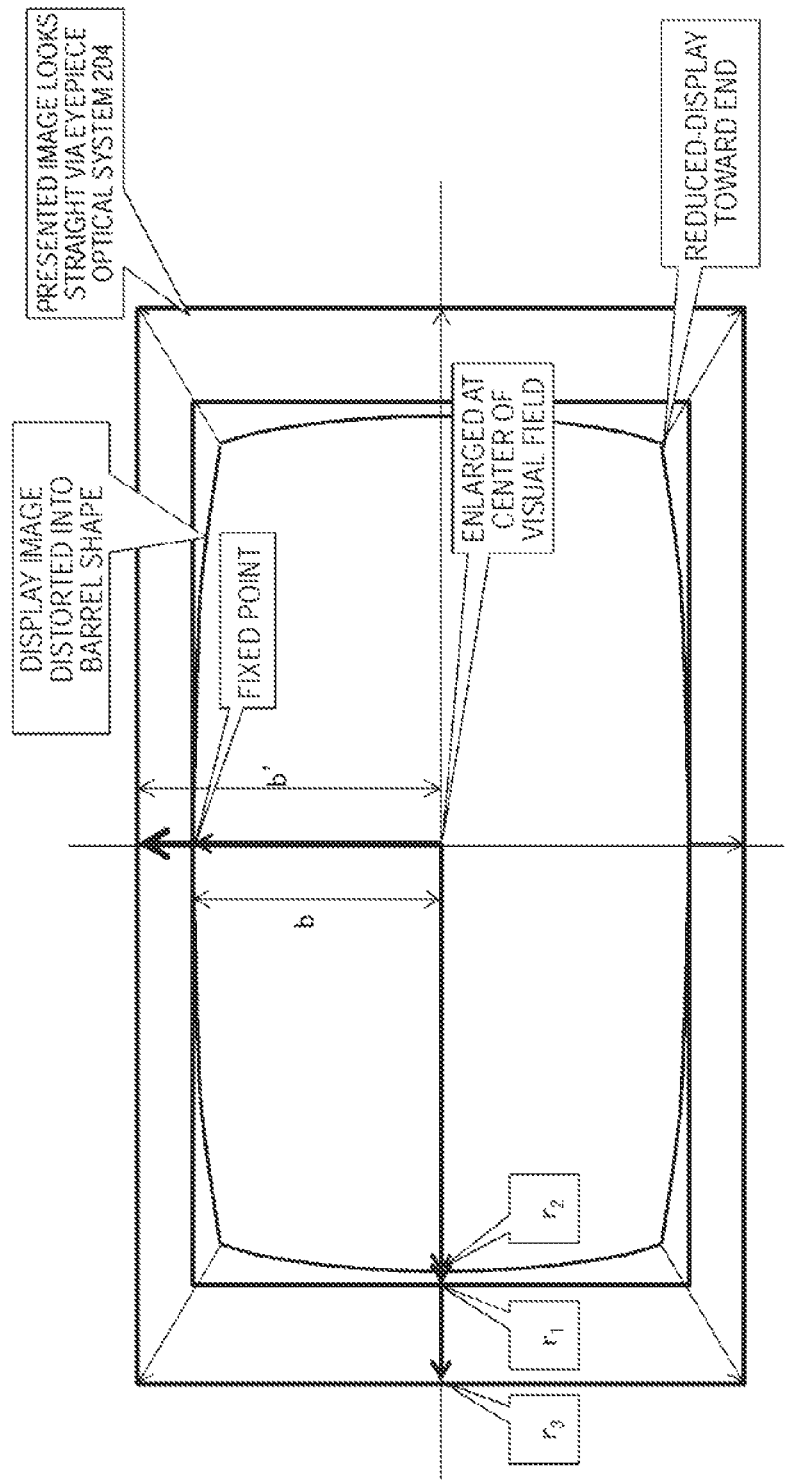
FIG. 4 is a diagram showing an exemplary signal process of distorting the presented image into a barrel shape.

For example, in the case where the pin-cushion distortion as shown in FIG. 3 is generated in the eyepiece optical system, the image correction unit 202 performs the signal process of giving distortion in a direction opposite to the pin-cushion distortion, that is, the image correction unit 202 enlarges the presented image at the center of a visual field and reduces toward the end to distorted in a barrel shape and displayed as shown in FIG. 4, and thereby, can eliminate the pin-cushion distortion from the projection image of the eyepiece optical system. At the center of the visual field, b'/b times (see formula (1) above) enlargement is performed. In FIG. 4, a pixel displayed at a point $r_2$ on the display screen is taken from a point $r_3$ in a post-correction visual field (see formula (3) below). The point $r_3$ in the post-correction visual field corresponds to a point $r_1$ on an original image in association with the enlargement of the visual field (see formula (4) below). A pixel displayed at the point $r_2$ on the display screen is taken from the point $r_1$ on the original image (see formula (5) below). Here, a distortion rate at the point $r_2$ is $D_r$ according to the enlargement of the visual field.

[Math 3]

$$r_3 = \left(1 + \frac{D_r}{100}\right)r_2 \quad (3)$$

[Math 4]

$$r_3 = \left(1 + \frac{D_b}{100}\right)r_1 \quad (4)$$

[Math 5]

$$r_1 = \frac{100 + D_r}{100 + D_b}r_2 \quad (5)$$

Figure 6:
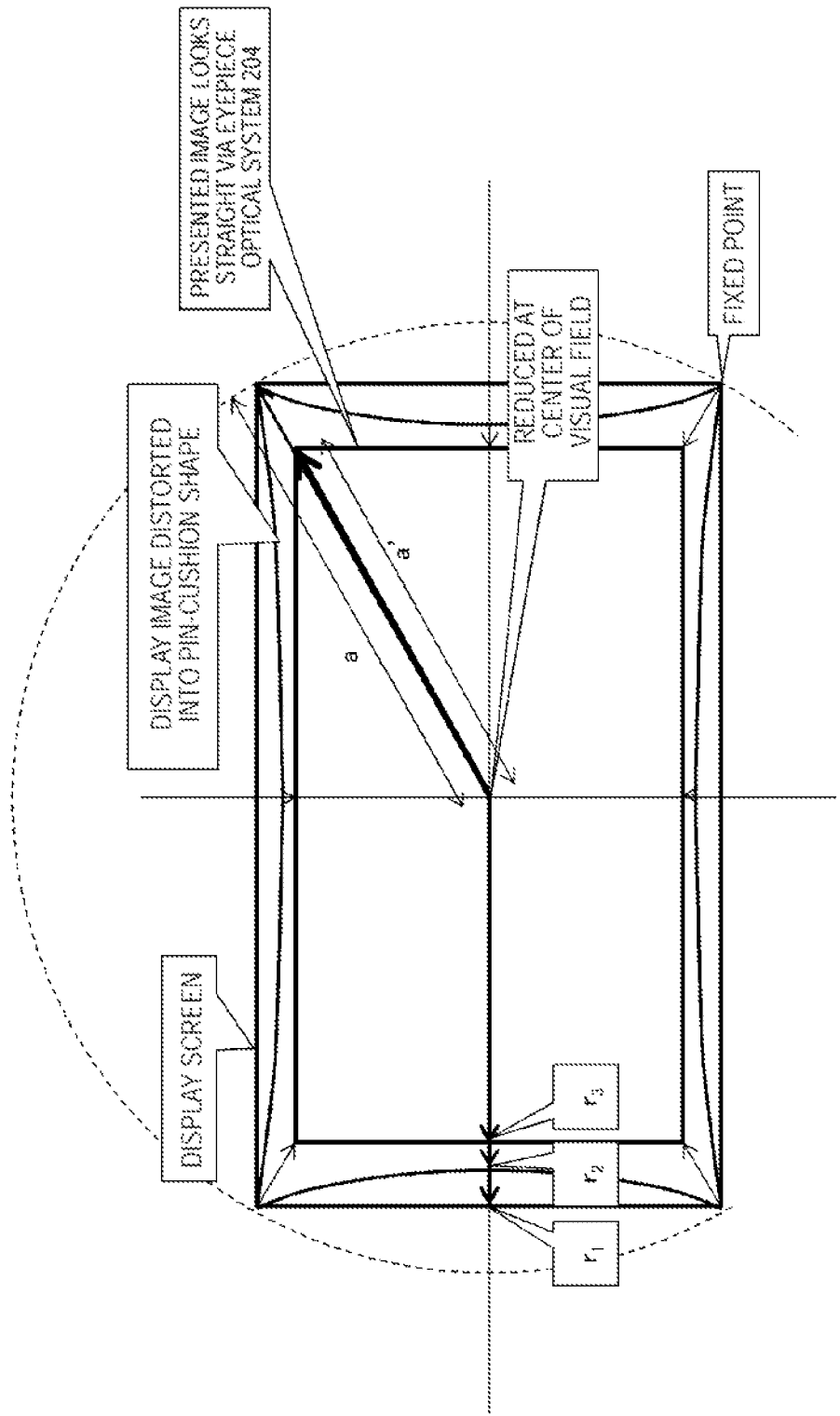
FIG. 6 is a diagram showing an exemplary signal process of distorting the presented image into a pin-cushion shape.

In the case where the barrel distortion as show in FIG. 5 is generated in the eyepiece optical system, the image correction unit 202 performs the signal process of giving distortion opposite to the barrel distortion. That is, the image correction unit 202, with the four corners of the original image being set as fixed points, reduces toward the visual field center to distort the presented image in a pin-cushion shape to be displayed as shown in FIG. 6, and thereby, can eliminate the barrel distortion from the projection image of the eyepiece optical system. At the center of the visual field, a'/a times (see formula (2) above) reduction is performed. In FIG. 6, a pixel displayed at the point $r_2$ on the display screen is taken from a point $r_3$ in the post-correction visual field (see formula (6) below). The point $r_3$ in the post-correction visual field corresponds to the point $r_1$ on the original image visual field in association with the enlargement (see formula (7) below). A pixel displayed at the point $r_2$ on the display screen is taken from the point $r_1$ on the original image (see formula (8) below). Here, the distortion rate at the point $r_2$ is $D_r$ according to the enlargement of the visual field.

[Math 6]

$$r_3 = \left(1 + \frac{D_r}{100}\right)r_2 \quad (6)$$

[Math 7]

$$r_3 = \left(1 + \frac{D_a}{100}\right)r_1 \quad (7)$$

[Math 8]

$$r_1 = \frac{100 + D_r}{100 + D_a}r_2 \quad (8)$$

Figure 7:
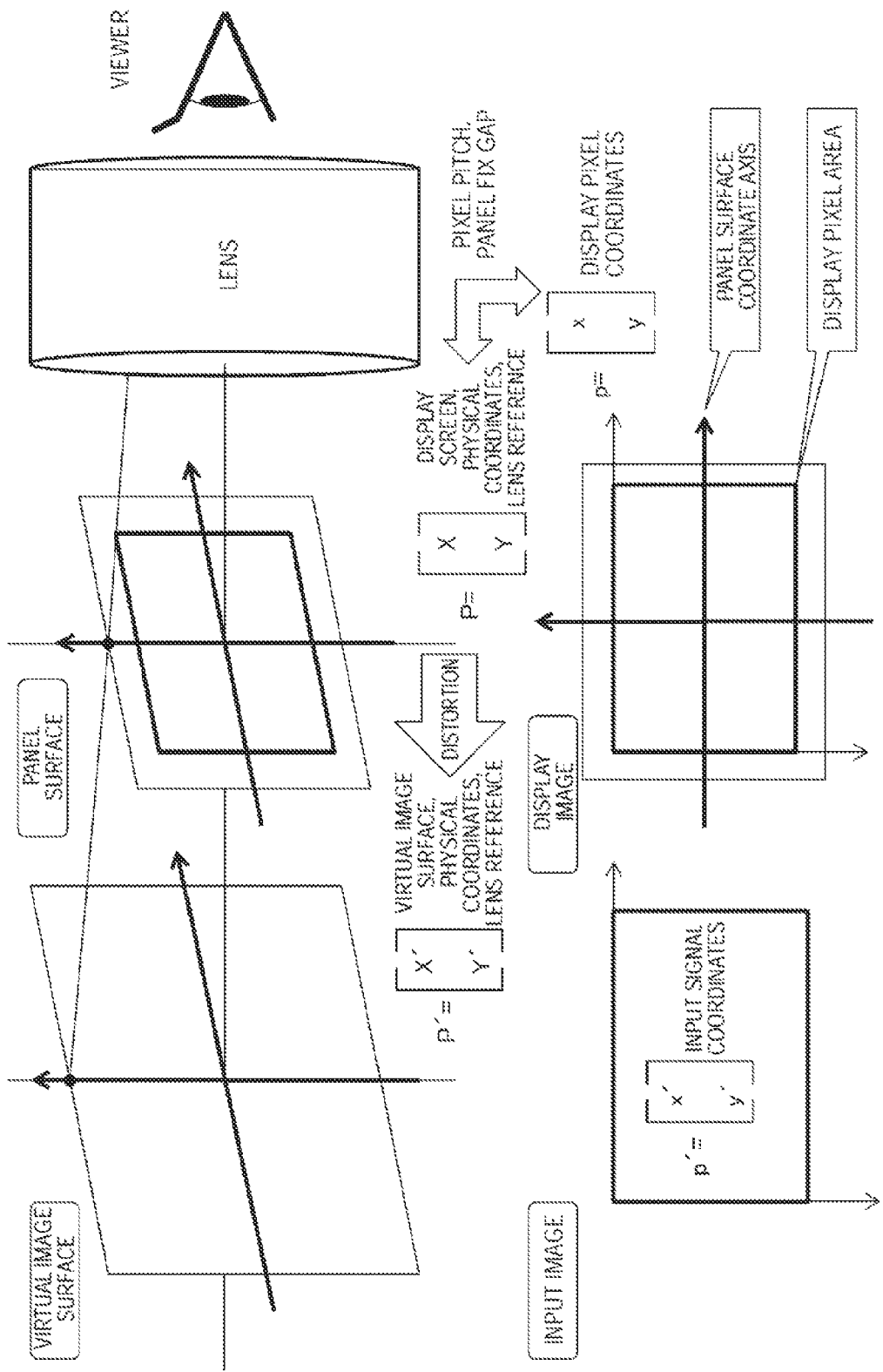
FIG. 7 is an illustration schematically showing a correction model by an image correction unit 202.

FIG. 7 schematically shows a correction model by the image correction unit 202. Assume below that input signal coordinates of the presented image input to the HDMI reception unit 201 are p' (x', y'), and display pixel coordinates of the display image on the screen of the display unit 203 are p (x, y). Physical coordinates on the screen of the display unit 203 using the lens as a reference are P (X, Y) and physical coordinates on a surface of the virtual image which is formed by projecting the screen of the display unit 203 by the eyepiece optical system 204 using the lens as a reference are P' (X', Y').

Between the display pixel coordinates p (x, y) of the display image on the screen of the display unit 203 and the physical coordinate P (X, Y) on the screen of the display unit 203 using the lens of the eyepiece optical system 204 as a reference, there exist a difference in pixel pitch and a position gap in fixing the display unit 202 at a certain site in the head-mount unit 10. Between the physical coordinate P (X, Y) on the screen of the display unit 203 and a physical image P' (X', Y) on the virtual image surface corresponding thereto, the distortion generated in the eyepiece optical system 204 is included.

Figure 8:
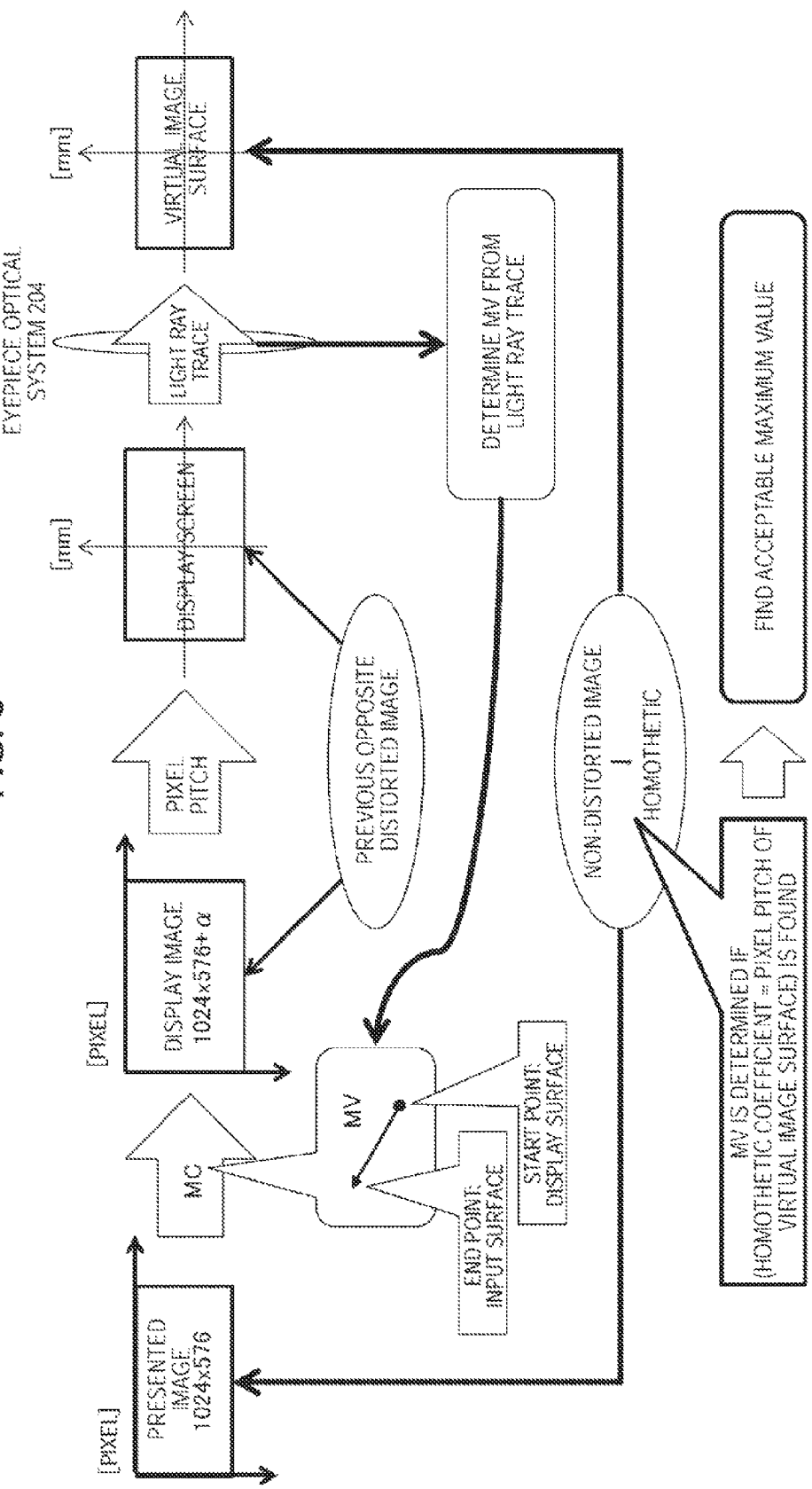
FIG. 8 is a diagram for explaining a process procedure for correcting the presented image in the head-mount display.

FIG. 8 illustrates a process procedure for correcting the presented image in the head-mount display according to the embodiment.

The HDMI reception unit 201 receives, for example, the presented image of a 1024×576 pixel size from the image source such as the Blu-ray disc reproduction device 20.

Each pixel of the presented image passes through the eyepiece optical system 204 to cause the distortion to be generated. The image correction unit 202 gives the distortion in the opposite direction to each pixel of the presented image to perform motion compensation (MC), that is, displacement of each pixel generated due to the distortion is compensated to generate a display image subjected to a previous opposite distortion. The distortion in the opposite direction given to the pixel is referred to as a motion vector (MV). The motion vector has an end point at a pixel position on the presented image and a start point at a pixel position on the display image corresponding to the end point.

Assume that the display image subjected to the previous opposite distortion has a 1024×576+α pixel size. The image correction unit 202 with taking into account the pixel pitch of the screen of the display unit 203 converts the size of the display image having 1024×576+α pixel size so as to be displayed on the screen. The display image is formed by the eyepiece optical system 204 on the virtual image surface. Since the display image displayed on the screen in the display unit 203 has been subjected to the previous opposite distortion, the virtual image is an image with no distortion similar to the original presented image.

By tracing a light ray as a displayed light on the screen of the display unit 203 which passes through the eyepiece optical system 204 and reaches the virtual image surface, the above described motion vector MV can be found.

The presented image and the virtual image are homothetic. If a homothetic coefficient, that is, the pixel pitch of the virtual image surface is found, the motion vector can be found.

The image includes a plurality of chrominance signal components such as an RGB. The image correction unit 202 performs separation according to a color component of the presented image to perform the process of the above previous opposite distortion for each color component such that the distortion generated in passing through the eyepiece optical system 204 and the chromatic aberration can be corrected at the same time.

A description is give of a method for generating the motion vector with reference to FIG. 9.

Figure 9A:
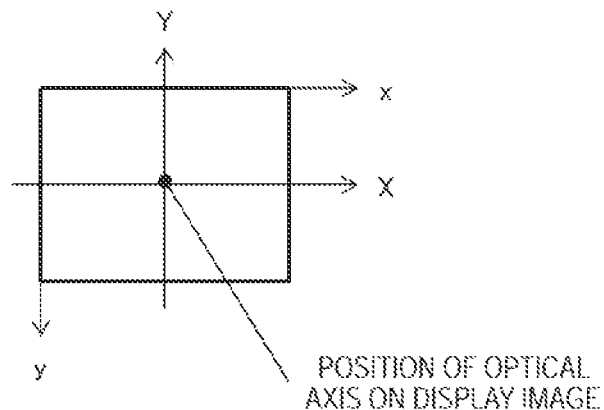
FIG. 9A is a diagram for explaining a method for generating a motion vector.

As shown in FIG. 9A, assume that image coordinates on a display surface of the screen of the display unit 203 are P (X, Y) (unit: pixel) and physical coordinates on the screen of the display unit 203 are P (X, Y) (unit: mm) Here, assuming that a position of an optical axis on the display image is $p_a$ ($x_a$, $y_a$) position of the physical coordinates P (X, Y) corresponding to a position on the image coordinates P (X, Y) is represented as formula (9) below. Here, $d_p$ is the pixel pitch (mm/pixel) of the screen of the display unit 203

[Math 9]

$$P = \begin{bmatrix} X \\ Y \end{bmatrix} = d_p \begin{bmatrix} x - x_a \\ y_a - y \end{bmatrix} \quad (9)$$

Figure 9B:
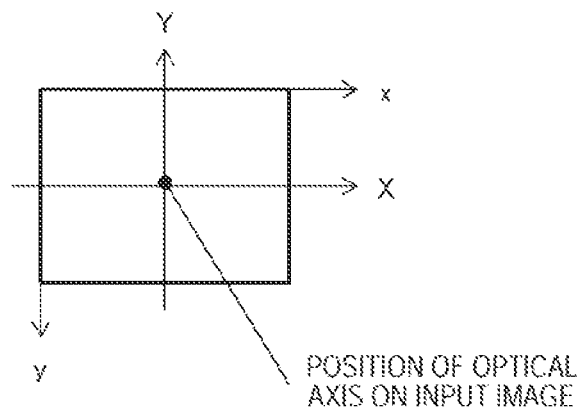
FIG. 9B is a diagram for explaining a method for generating a motion vector.

On the other hand, as shown in FIG. 9B, image coordinates on the input signal surface of the virtual image which is formed by projecting the screen of the display unit 203 by the eyepiece optical system is P' (X', Y) (unit: pixel) and on physical coordinate the virtual image surface is P' (X', Y') (unit: mm) Here, assuming that a position of the optical axis on an input image is $p'_a$ ($x'_a$, $y'_a$), a position of the physical coordinates P' (X', Y) on the screen corresponding to a coordinate position P' (X', Y') on the input image is represented by formula (10) below. Here, $d_v$ is the pixel pitch (mm/pixel) on the virtual image.

[Math 10]

$$P' = \begin{bmatrix} X' \\ Y' \end{bmatrix} = d_v \begin{bmatrix} x' - x'_a \\ y'_a - y' \end{bmatrix} \quad (10)$$

Here, formula (11) below represents that the physical coordinate P (X, Y) on the screen of the display unit 203 is displaced to the physical coordinate P' (X', Y') on the virtual image surface by a distortion f generated due to the eyepiece optical system 204. Here, f contains also the chromatic aberration.

[Math 11]

$$P = \begin{bmatrix} X \\ Y \end{bmatrix} \xrightarrow{f} P' = \begin{bmatrix} X' \\ Y' \end{bmatrix} = f(P) \quad (11)$$

By use of the distortion f, the coordinate position P' (X', Y') on the input image can be represented as formula (12) below using the image coordinate position P (X, Y) corresponding thereto on the display surface, the position $p_a$ ($x_a$, $y_a$) of the optical axis on the display image, and the position $p'_a$ ($x'_a$, $y'_a$) of the optical axis on the input image. Here, p is a variable, and $p_a$ and $p'_a$ are constants such as the design value.

[Math 12]

$$p' = \begin{bmatrix} x' \\ y' \end{bmatrix} = \begin{bmatrix} x'_a \\ y'_a \end{bmatrix} - \frac{1}{d_v}\begin{bmatrix} 1 & 0 \\ 0 & -1 \end{bmatrix} f\left(\begin{bmatrix} x - x_a \\ y_a - y \end{bmatrix}\right) \quad (12)$$

Therefore, a motion vector $MV_{(x, y)}$ can be obtained which gives a distortion in the direction opposite to the distortion f at arbitrary image coordinate position P (X, Y) on the display surface.

[Math 13]

$$MV_{(x,y)} = \begin{bmatrix} x' \\ y' \end{bmatrix} - \begin{bmatrix} x \\ y \end{bmatrix} \quad (13)$$

As examples of a method for finding the distortion f generated due to the eyepiece optical system 204, there can cited a method by way of calculating an optical simulator used for design of lens constituting the eyepiece optical system 204, and a method by way of actual measurement using a produced real eyepiece optical system 204. In the latter method, a certain pixel P (X, Y) on display screen of the display unit 203 is made to be lighted, a virtual image of which is shot by a camera (that is, the image is shot via the eyepiece optical system 204) to find a position P' (X', Y') of a luminescent spot.

By way of any of the above methods, the motion vectors $MV_{(x, y)}$ can be obtained at all the pixel positions P (X, Y) on the screen of the display unit 203. Tabling the respective motion vectors $MV_{(x, y)}$ of the pixel positions P (X, Y) to be held allows that the image correction unit 202 refers to the table for each pixel position P (X, Y) to obtain the motion vector $MV_{(x, y)}$ so as to give the display image the distortion in the opposite direction.

However, if the motion vectors $MV_{(x, y)}$ at all the pixel positions P (X, Y) on the screen of the display unit 203 are held, the table is bloated in connection with the image size.

There has been already known a method in which, by use of a feature that the distortion in the optical system is point-symmetric with respect to an image (rotationally symmetric with respect to an optical axis), a correction data for an area of half or quarter of the image is used also for the symmetric area (as described above). However, such a reduction method cannot correct the image with high accuracy with respect to the non-point-symmetric distortion due to the eyepiece optical system 204. Additionally, the distortion appearing on the virtual image surface is not necessarily caused by the distortion of the lens of the eyepiece optical system 204. For example, the image distortion caused by the position gap in fixing the display unit 202 at a certain site in the head-mount unit 10 is not rotationally symmetric with respect to the optical axis.

Therefore, the embodiment achieves the reduction of the table size without assumption that the distortion generated on the virtual image surface is rotationally symmetric with respect to the optical axis. Specifically, representative pixels are discretely set on the display surface of the display unit 203, and the motion vector obtained only at a position of the representative pixel is held. Then, at a position of the pixel other than the representative pixel, interpolation with the motion vectors of one or more surrounding representative pixels allows the motion vectors at all the pixel positions to be obtained.

Figure 10:
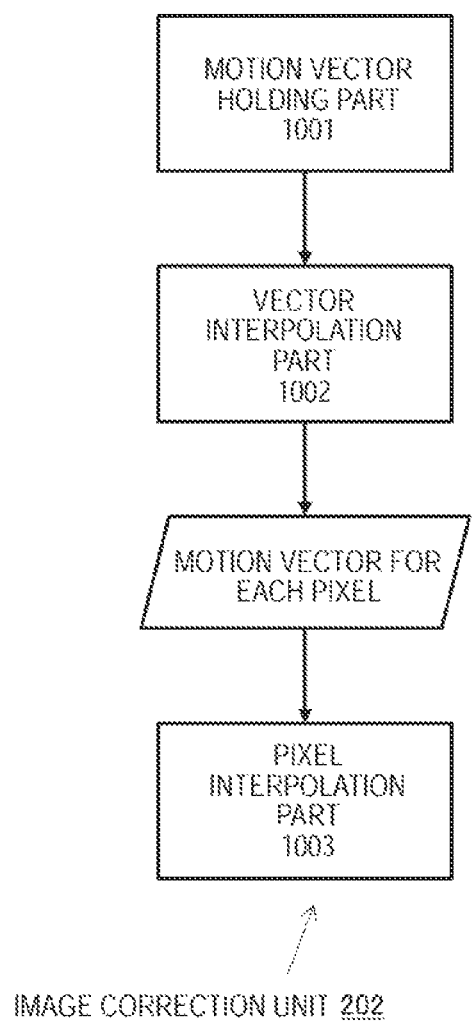
FIG. 10 is a diagram showing an exemplary configuration of the image correction unit 202.

FIG. 10 shows an exemplary configuration of the image correction unit 202 which gives the display image the opposite distortion using the motion vector for each representative pixel.

Figure 11:
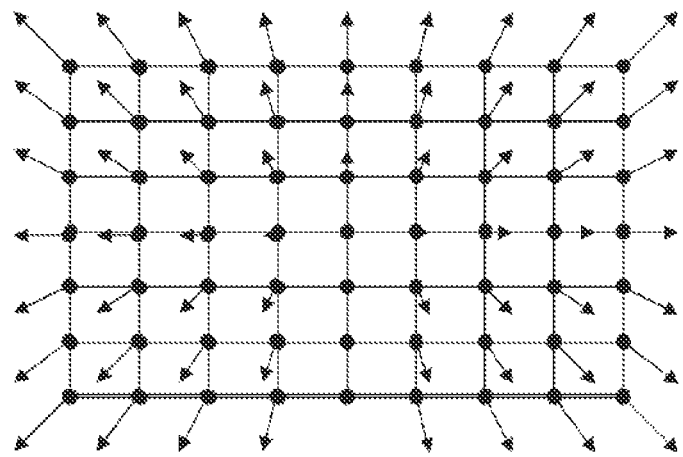
FIG. 11 is diagram showing a state where a motion vector is obtained for each grid point of a sparse grid covering over a display screen of a display unit 203.

A motion vector holding part 1001 holds the motion vector obtained at a position of each of the representative pixels which are discretely set on the display surface of the display unit 203. A typical exemplary representative pixel is each of grid points in a case where a sparse grid covers over the display screen of the display unit 203. A position on the input signal surface (i.e., virtual image side of the eyepiece optical system) corresponding to each grid point on the display screen (i.e., incident side of the eyepiece optical system 204) is held as motion vector data in the table. FIG. 11 shows a state where the motion vector is obtained for each grid point of the sparse grid covering over the display screen of the display unit 203.

Figure 12:
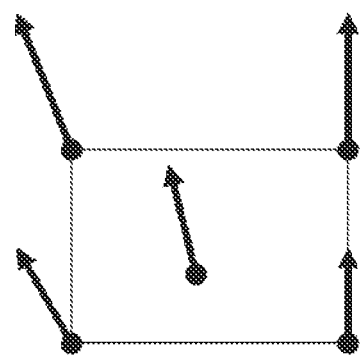
FIG. 12 is a diagram showing a state where a deformation vector of a pixel to be interpolated is found from four neighborhoods by bilinear interpolation.

A vector interpolation part 1002 performs interpolation with the motion vectors of one or more surrounding representative pixels at a position of the pixel other than the representative pixel to calculate the motion vectors. For example, as shown in FIG. 12, a deformation vector of the pixel to be interpolated is calculated from the motion vectors at four neighborhoods, that is, four grid points in the neighborhood by bilinear interpolation. Alternatively, the motion vector of the pixel other than the representative pixel may be interpolated from the grid points at 16 neighborhoods by cubic spline interpolation.

Figure 13:
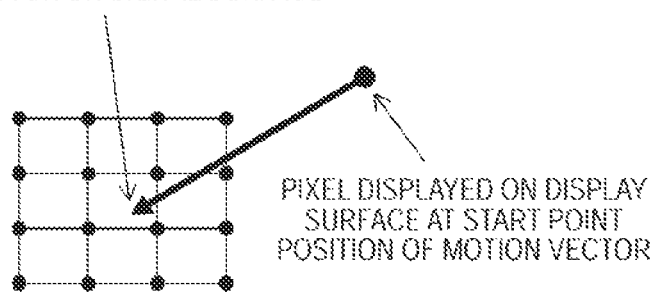
FIG. 13 is a diagram showing a state where pixel data is corrected on the basis of the motion vector.

A pixel correction part 1003 gives, for each pixel, distortion in a direction opposite to the distortion generated in the eyepiece optical system 204 on the basis of the motion vector held in the motion vector holding part 1001 or the motion vector interpolated by the vector interpolation part 1002. FIG. 13 shows a state where pixel data is corrected in the pixel correction part 1003 on the basis of the motion vector. As shown in the figure, the pixel data to be displayed at a position at a start point of the motion vector on the display screen of the display unit 203 is taken from a position of the end point of the motion vector on the signal surface. At this time, if a referred portion, that is, the position of the end point of the motion vector is located between the pixels, interpolation is performed with a weighted sum of the pixel values in the neighborhood.

Figure 14:
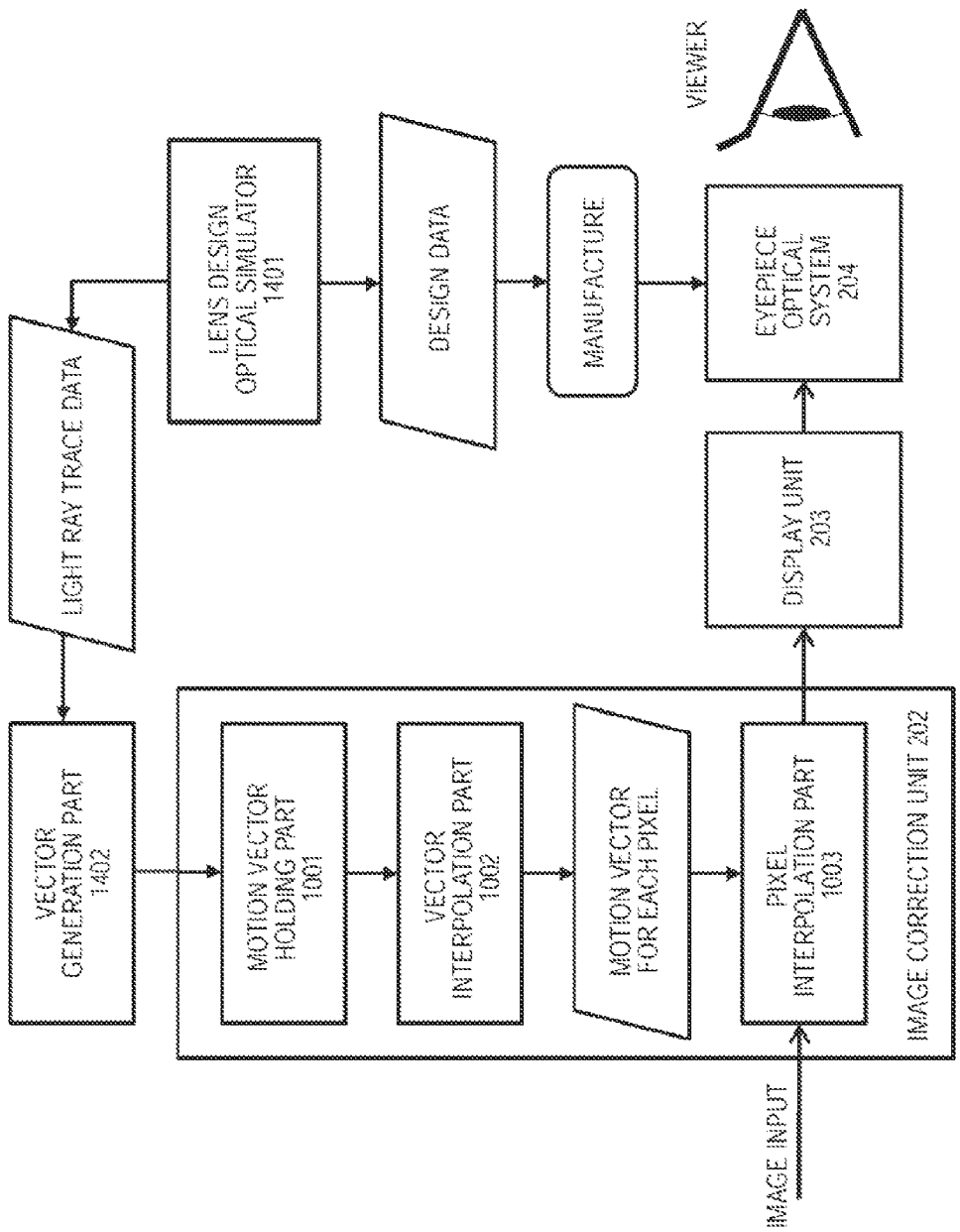
FIG. 14 is an illustration schematically showing an overview of the head-mount display including the motion vector generation.

FIG. 14 schematically shows an overview of the head-mount display including the motion vector generation.

Design data for the lens constituting the eyepiece optical system 204 can be found on the basis of results of many times simulations by an optical simulator 1401 for lens design. Then, the lens is manufactured on the basis of the obtained design data to produce the lens constituting the eyepiece optical system 204.

Further, the distortion f generated due to the eyepiece optical system 204 can be calculated by the optical simulator 1401 (as described above). Specifically, a position of the pixel luminescent spot P' (X', Y') on the virtual image corresponding to a certain pixel P (X, Y) on the display screen of the display unit 203 is found using light ray trace by the optical simulator 1401. The vector generation part 1402 generates, on the basis of such light ray trace data, the motion vector at each grid point in the case where the sparse grid covers over the display screen of the display unit 203.

The motion vector generated by the vector generation part 1402 is stored in the motion vector holding part 1001. Then, the vector interpolation part 1002 performs interpolation with the motion vectors of one or more surrounding representative pixels at a position of the pixel other than the representative pixel to calculate the motion vectors. The pixel correction part 1003 gives, for each pixel, distortion in a direction opposite to the distortion generated in the eyepiece optical system 204 on the basis of the motion vector held in the motion vector holding part 1001 or the motion vector interpolated by the vector interpolation part 1002.

The presented image is displayed on the screen which has been corrected by the image correction unit 202 with the distortion in the opposite direction. The display image on the screen is projected to a retina of an observer' eye through the eyepiece optical system. When a light of the display image passes through the eyepiece optical system, the distortion is generated, in the direction opposite to which distortion the display image is given the distortion, and thus, a normal virtual image with no distortion is formed on the retina.

In order to create the motion vector for image correction, a size (scale) of the input image on the virtual image surface needs to be determined. The display scale, can be expressed as the pixel pitch on the virtual image surface, for example.

The display scale is preferably maximum as much as possible in a range of an acceptable input image. In the example shown in FIG. 6, the range of the acceptable input image is shown by a dotted line. Of rectangles having a desired aspect ratio which are inscribed in a circle indicating the acceptable range, the maximum one is taken as the display scale. Separation according to each color of the RGB is performed and the narrowest one is conformed. There are cases where a pixel range of the display screen of the display unit 203 has the same aspect ratio as the presented image and is vertically longer than the presented image. IF the display unit 203 has a burn-in prevention function for the display screen (orbit operation), an I/F effective range may be narrower than the pixel range in some cases.

Figure 15:
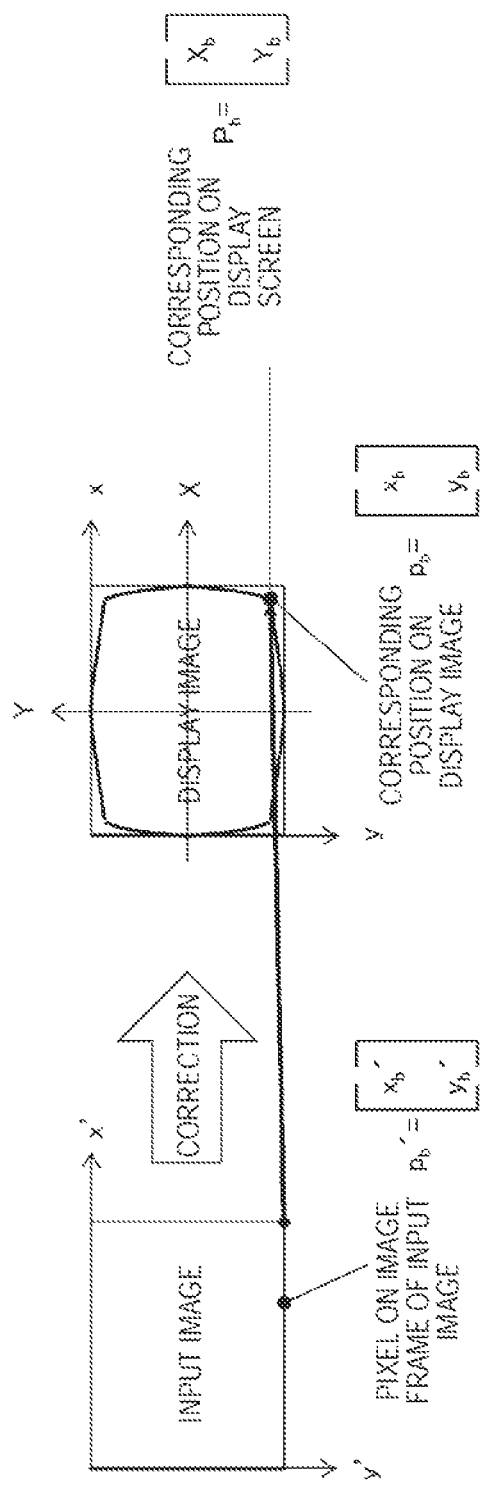
FIG. 15 is a diagram for explaining a method for determining a display scale.

A description is given of a method for determining the display scale with reference to FIG. 15. First, scale limitation due to the pixel the display screen is described. As shown in formula (14) below, in a case where a pixel $p_b'$ on an image frame of the input image is moved to a corresponding point $p_b$ on the display image, the maximum $d_v$ is found such that a condition represented by formula (15) below is met.

[Math 14]

$$p_b' = \begin{bmatrix} x_b' \\ y_b' \end{bmatrix} \rightarrow p_b = \begin{bmatrix} x_b \\ y_b \end{bmatrix} \quad (14)$$

[Math 15]

$$x_{min} \leq x_b \leq x_{max} \quad (15)$$
$$y_{min} \leq y_b \leq y_{max}$$

Subsequently, scale limitation due to an image circle is described. As shown in formula (16) below, in case where the pixel $p_b'$ on the image frame of the input image is moved to the corresponding point $P_b$ on the display screen, the maximum $d_v$ is found such that a condition represented by formula (17) below is met. Here, $R_{im}$ is a radius of the image circle of the optical system.

[Math 16]

$$p'_b = \begin{bmatrix} x'_b \\ y'_b \end{bmatrix} \rightarrow P_b = \begin{bmatrix} X_b \\ Y_b \end{bmatrix} \quad (16)$$

[Math 17]

$$\sqrt{X_b^2 + Y_b^2} \leq R_{im} \quad (17)$$

When the image having the aspect ratio of 16:9 is displayed on the display screen having the aspect ratio of 4:3, the pixels remained at upper and lower portions of the display screen, but the visual field is preferably prevented from being lost in correcting by the image correction unit 202.

In the lens design, the angle of view is measured at a horizontal end. A display range can only be narrowed in principal in the correction. If the horizontal end is used as a fixed point for correction, the angle of view upon the lens design is kept. Therefore, the screen of the display unit 203 is set to be vertically longer compared with the aspect ratio of the image to be presented as well as the lens design is made such that the eyepiece optical system 204 generates the substantially pin-cushion shaped distortion. Then, the presented range is determined such that the horizontal end is brought into contact (the angle of view at the horizontal end may not be changed due to the image correction).

FIG. 16A shows the virtual image in a case of the lens design for the eyepiece optical system 204 so as to generate the pin-cushion distortion. The image having the aspect ratio of 16:9 distorted into the pin-cushion shape, when displayed on the screen having the aspect ratio of 4:3 with horizontal directions being matched, is vertically protruded as shown in the figure.

FIG. 16B shows a result of performing correction of distorting into a barrel shape on the pin-cushion distortion display image shown in FIG. 16A. As described above, the horizontal end is used as a fixed point for correction. The image is displayed with being reduced toward the end of the screen. Vertically protruded portions are generated, which causes no problem because the aspect ratio of the image is 4:3.

The pixel correction part 1003 performs the image correction with the processes in the vertical direction and the horizontal direction being separated which are performed in series for each direction. In other words, the motion vector for each pixel is calculated while the correction is performed in the order of the vertical direction to the horizontal direction.

Figure 17:
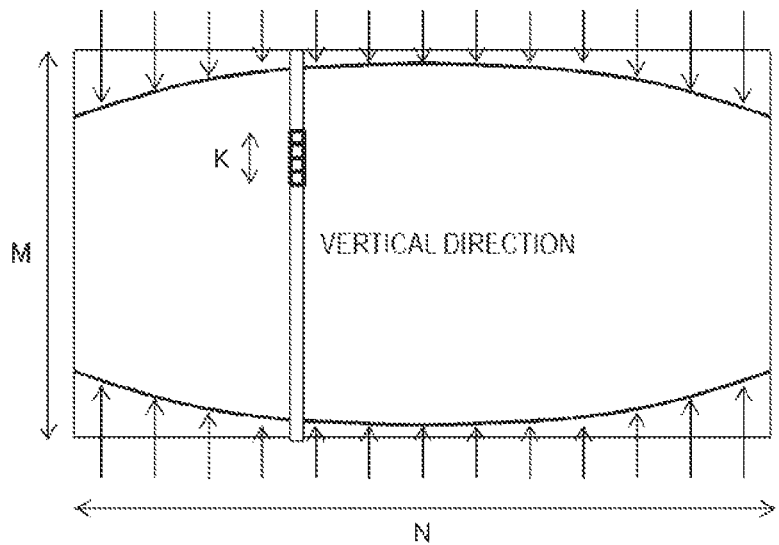
FIG. 17 is a diagram showing a state where a pixel is moved in the same vertical line for each line to perform correction in a vertical direction by use of a vertical direction filter.
Figure 18:
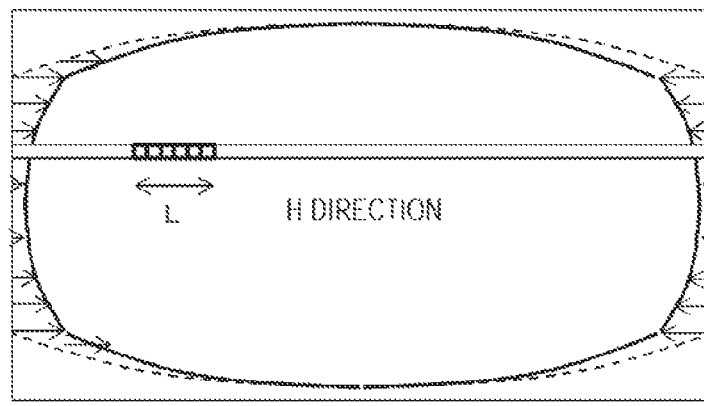
FIG. 18 is a diagram showing a state where a pixel is moved in the same horizontal line for each line to perform correction in a horizontal direction by use of a horizontal direction filter.

The pixel correction part 1003, first, moves the pixel in the same vertical line for each line to perform the correction in the vertical direction as shown in FIG. 17. After that, the pixel correction part 1003 subsequently moves the pixel in the same horizontal line for each line to perform the correction in the horizontal direction as shown in FIG. 18. In this way, separation of the processes in the vertical direction and the horizontal direction advantageously allows the process in the each direction to be achieved with a one-dimensional filter and the number of times of summing products of the filter to be reduced. For example, assuming that a tap number of the vertical direction filter is K, and a tap number of the horizontal direction filter is L, the number of times of summing products is (K+L)×M×N (here, M is a number of pixels in the vertical direction, N is a number of pixels in the horizontal direction). In contrast, if a two-dimensional filter having the same tap number in the vertical and horizontal direction is used, the number of times of summing products is large as much as K×L×M×N. Increase of the tap number increases an effect from reduction of the number of times of summing owing to the separation process in the vertical and horizontal directions.

Figure 19:
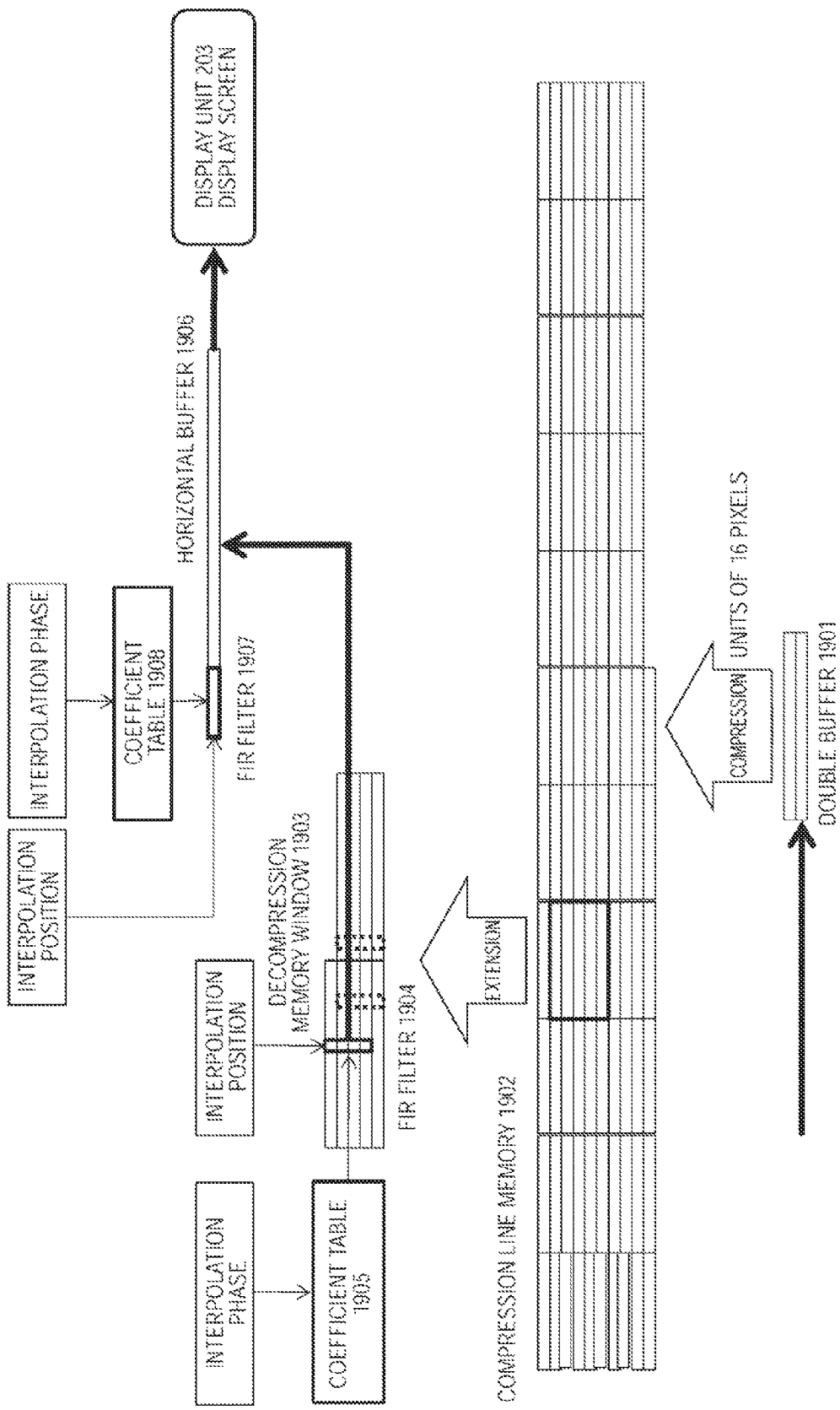
FIG. 19 is a diagram showing an exemplary configuration of a pixel interpolation unit 1003 in which FIR filters in the vertical and horizontal directions are combined to perform a pixel interpolation process.

FIG. 19 shows an exemplary configuration of the pixel interpolation unit 1003 in which FIR (Finite Impulse Response) filters in the vertical and horizontal directions are combined to perform the pixel interpolation process.

A double buffer 1901 writes input data into one buffer and compresses the other buffer when the one buffer is full to perform a compress process in units of 16 pixels in the horizontal direction. A compression line memory 1902 stores the data compressed in units of 16 pixels in the horizontal direction and can be randomly accessed in the units.

The data read out from the compression line memory 1902 is subjected to an extension process, and thereafter, held in a decompression memory window 1903 for a convolution process. However, a portion to be processed next is read ahead and decompressed. An FIR filter 1904 in the vertical direction scans over the decompression memory window 1903 in the horizontal direction. At each interpolation position, a tap coefficient for each interpolation phase is read from a coefficient table 1905 and set to each tap of the FIR filter 1904.

Output of the FIR filter 1904 is written into a corresponding horizontal position in a horizontal buffer 1906. The horizontal buffer 1906 has a size of horizontal correction amount+tap length.

An FIR filter 1907 in the horizontal direction scans over the horizontal buffer 1906. At each interpolate position, a tap coefficient for each interpolation phase is read from a coefficient table 1908 and set to each tap of the FIR filter 1907. Output of the FIR filter 1907 is set to a pixel value at a corresponding pixel position in the display screen of the display unit 203.

Figure 20:
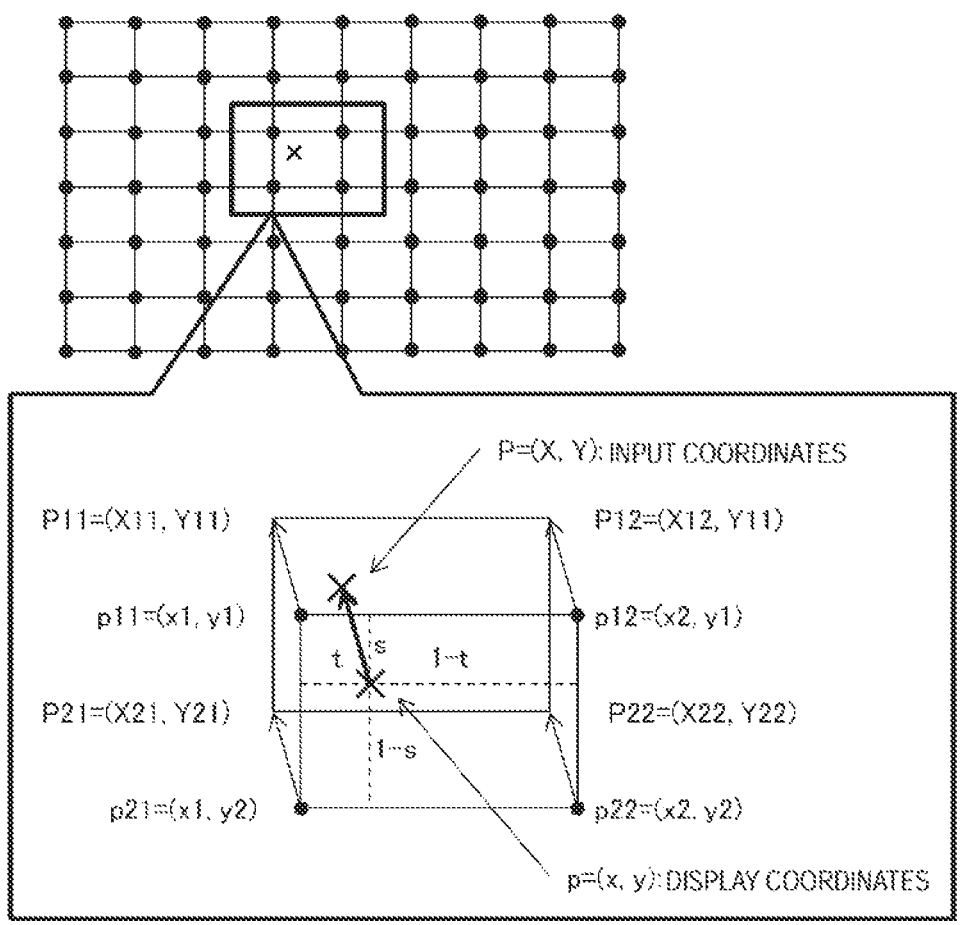
FIG. 20 is a diagram for explaining a mechanism of interpolating a pixel value on the basis of the motion vector at each grid point.

FIG. 20 illustrates a mechanism of interpolating the pixel value on the basis of the motion vector at each grid point.

The motion vector holding part 1001 has input positions P11, P12, P21, and P22 described therein as the motion vectors of the grid points p11, p12, p21, and p22 on the display screen for each of which each of the input positions is displayed.

The vector interpolation part 1002 calculates the motion vector of a pixel p=(x, y) surrounded by the grid points p11, p12, p21, and p22 on four corners, that is, the input position P=(X, Y) displayed for the display coordinates p (x, y), in accordance with formula (18) below.

[Math 18]

$t=x-x1;$ $s=y-y1;$ $X=(1-s)(1-t)X11+(1-s)tX12+s(1-t)X21+stX22;$ $Y=(1-s)(1-t)Y11+(1-s)tY12+s(1-t)Y21+stY22; \quad (18)$ If the end point position P=(X, Y) of the motion vector is located between the pixels, the pixel correction part 1003 performs interpolation with a weighted sum of the pixel values in the neighborhood (see FIG. 13).

Figure 21:
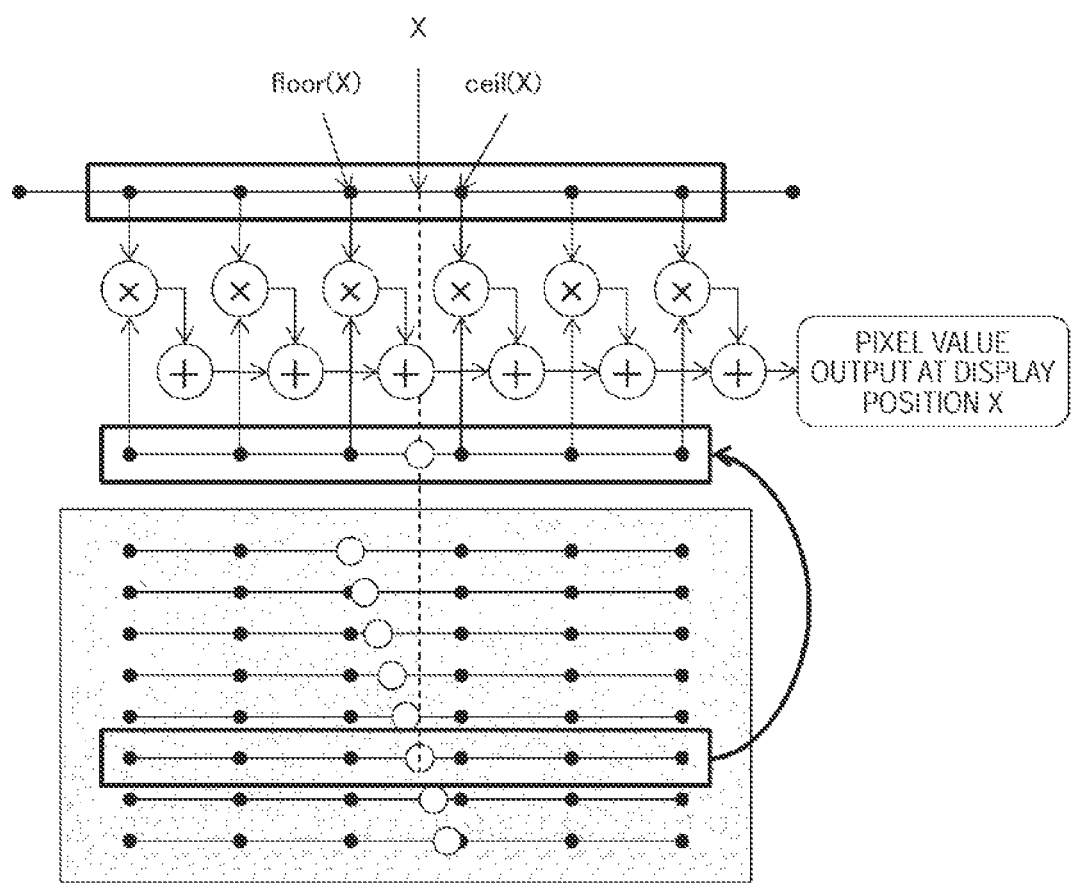
FIG. 21 is a diagram showing an exemplary configuration of a one-dimensional filter used when the interpolation process is performed by the pixel interpolation unit 1003 by way of separation in the vertical direction and the horizontal direction.

FIG. 21 shows an exemplary configuration of the one-dimensional filter used when the interpolation process is performed by the pixel interpolation unit 1003 by way of separation in the vertical direction and the horizontal direction. In the figure, an FIR filter used in the horizontal direction is shown, and addresses of six pixels interposing a display position X therebetween are calculated to interpolate X by a horizontal six-tap filter. Each interpolate position is divided into eight phases and the display position X is rounded in units of one-eighth. The coefficient table stores therein eight kinds of filter coefficients for each interpolation phase.

Figure 22:
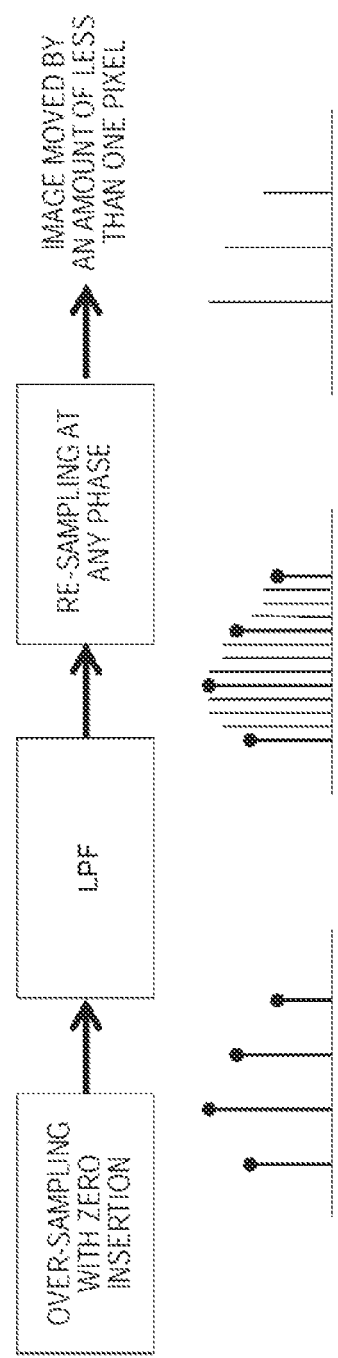
FIG. 22 is a diagram for explaining a one-dimensional interpolation process is performed in the vertical direction and the horizontal direction independently of each other by the pixel interpolation unit 1003.

FIG. 22 illustrates a one-dimensional interpolation process is performed in the vertical direction and the horizontal direction independently of each other by the pixel interpolation unit 1003. The pixel interpolation unit 1003 is oversampled by an eight-phase polyphase filter. Then, in a lowpass filter, a motion amount in units of one-eighth pixel is attained with eight kinds of coefficients. In the example shown in FIG. 19, there are four taps in the vertical direction and six taps in the horizontal direction, but a phase division number and the tap number are merely examples. The phase division number and the tap number are determined on the basis of image evaluation and circuit scale. An ideal lowpass filter is sin window in which impulse response continues infinitely. Since discontinuity is performed at the finite number of taps, the sin window is used for filtering, but Lanczos window may be used.

Figure 23:
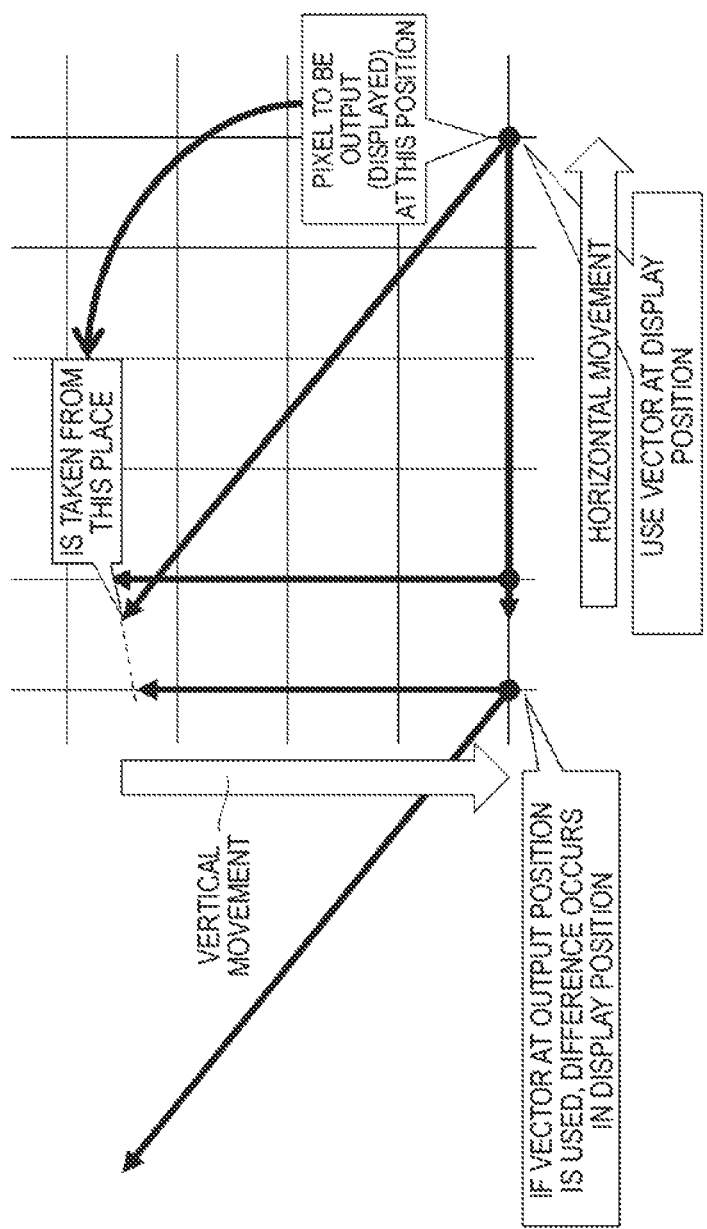
FIG. 23 is a diagram showing a method for acquiring the motion vector in the vertical direction and the motion vector in the horizontal direction when the interpolation process is performed by way of separation in the vertical direction and the horizontal direction.

When the interpolation process is performed by way of separation in the vertical direction and the horizontal direction by the pixel interpolation unit 1003, the motion amount for each of the vertical and horizontal directions needs to be found from the motion vector. When a two-dimensional interpolation process is performed, the display position of the pixel may be found in a direction opposite to the motion vector. In contrast, when the interpolation process is performed by way of separation in the vertical direction and the horizontal direction, first, the display position is found in the vertical direction of the motion vector and subsequently the display position is found in the horizontal direction, but, simple evaluation by way of the grid point on the display screen is not allowed. In other words, the motion vector which is made to act later needs to be found at a position moved by an amount of the motion vector of the direction which is made to act previously. FIG. 23 illustrates a method for acquiring the motion vector in the vertical direction and the motion vector in the horizontal direction when the interpolation process is performed by way of separation in the vertical direction and the horizontal direction.

Figure 24:
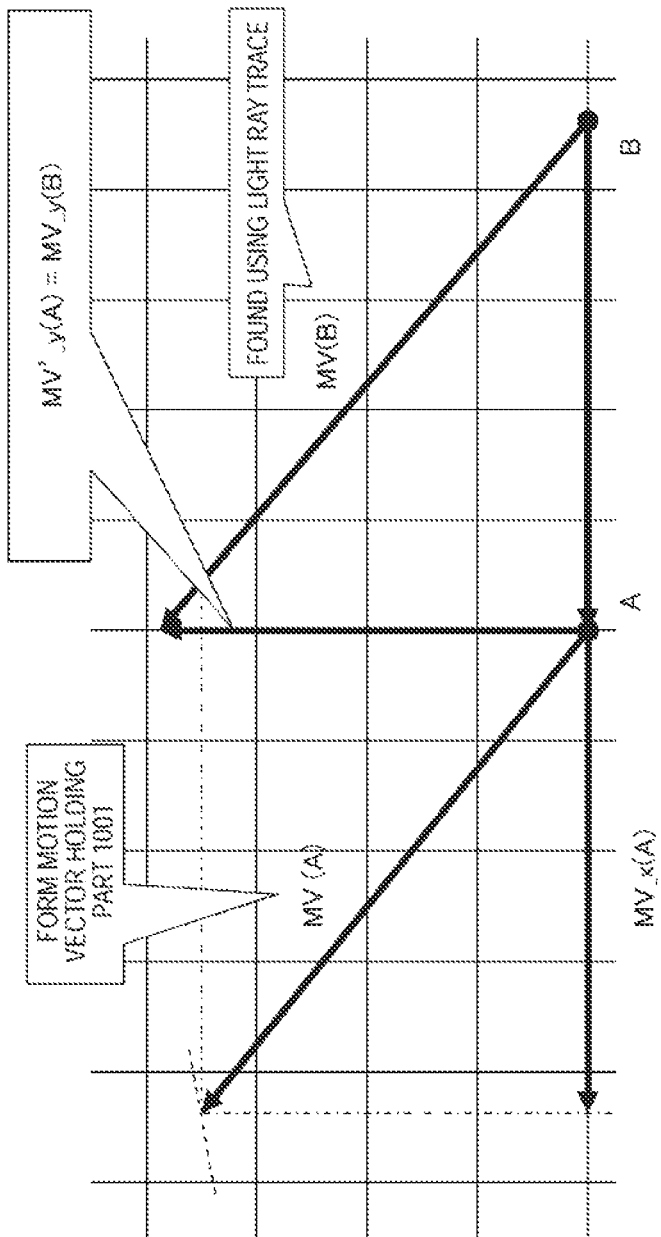
FIG. 24 is a diagram showing a method for previously correcting the motion vector in the vertical direction when the interpolation process is performed by way of separation in the vertical direction and the horizontal direction.

FIG. 24 illustrates a method for previously correcting the motion vector in the vertical direction when the interpolation process is performed by way of separation in the vertical direction and the horizontal direction. A motion vector MV(A) for a grid point A can be read from the motion vector holding part 1001. Here, the vector generation part 1402 finds a grid point B by the light ray such that A=B+MV_x(B) holds. Here, MV_x(B) is a horizontal component of the motion vector MV(B). Then, a vertical component of the motion vector MV(A) at the grid point A is previously corrected into MV'_y(A)=MV_y(B).

As already described, the display panel of the display unit 203 uses liquid crystal or organic EL elements, or the like, but these display elements are known in the industry to be likely to bring about a burn-in phenomenon in an area having large luminance difference. It is known that the orbit operation in which the display image is periodically moved (swung at ultralow frequency) is effective for preventing the burn-in phenomenon. However, if the display image is moved, the distortion generated in the pixel due to the eyepiece optical system 204 dose not correspond to the distortion in the opposite direction given to the pixel by the correction, and thus, the distortion is disadvantageously not eliminated.

Then, in the embodiment, the motion vector holding part 1001 has a configuration in which a correspondence relationship between an output pixel and the motion vector may be shifted to that in the horizontal and vertical directions as well as in a later stage thereof (after the image correction) means for shifting the display position of the image is included. Further, the shift of the correspondence relationship between the output pixel and the motion vector and the shift of the display position for burn-in prevention are made to operate in conjunction with each other to allow the orbit operation to be applied to the image correction for distortion elimination.

Figure 25:
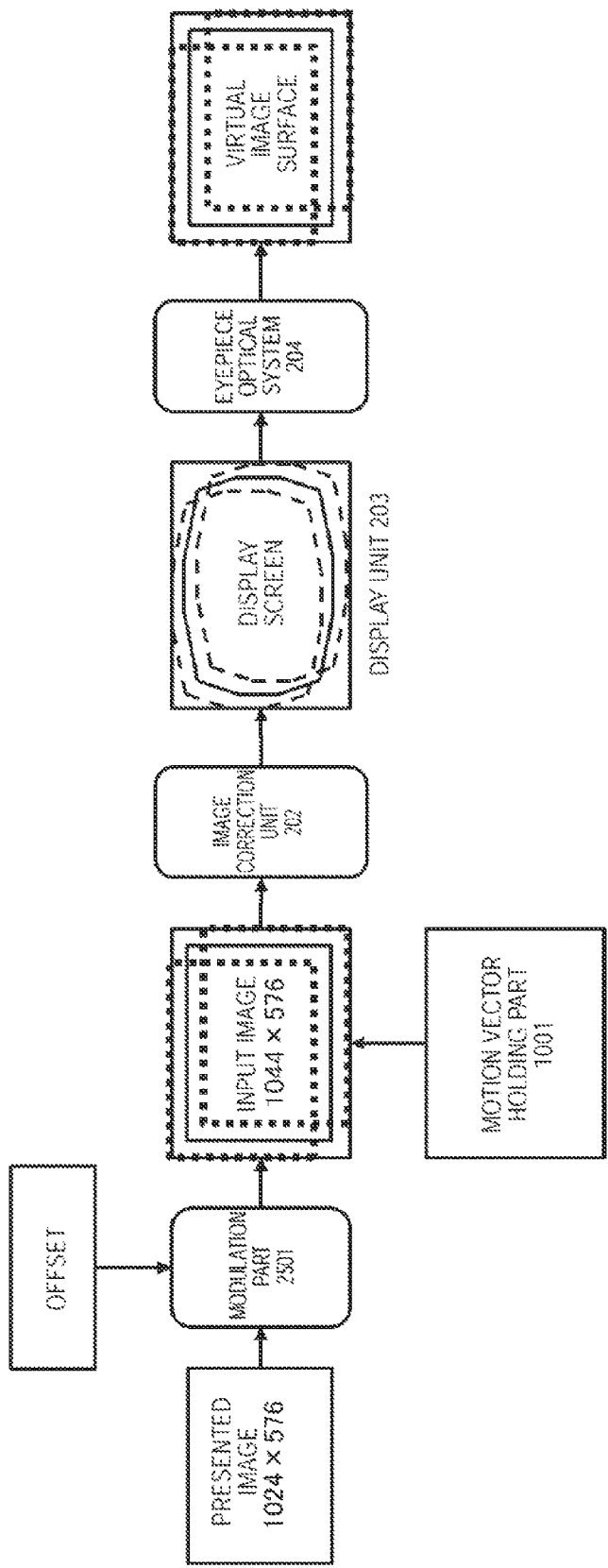
FIG. 25 is a diagram showing a principle diagram of burn-in prevention.

FIG. 25 shows a principle diagram of burn-in prevention. A modulation part 2501 offsets the display position of the presented image to swing the input image at the ultralow frequency. The image correction unit 202 uses the motion vector held in the motion vector holding part 1001 to give distortion in a direction opposite to the distortion generated in the eyepiece optical system 204 to the input image swinging at the ultralow frequency.

Figure 26:
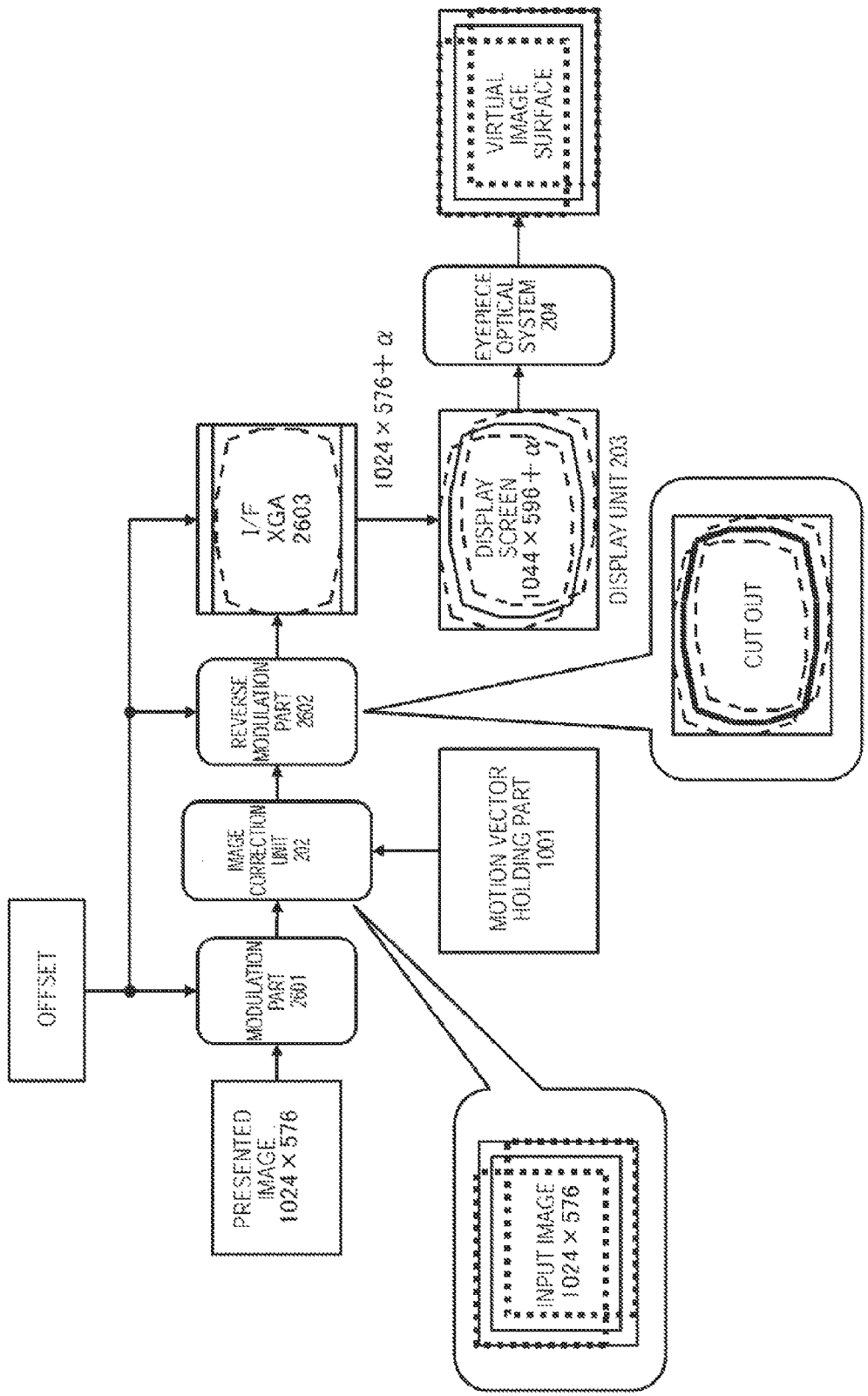
FIG. 26 is a diagram showing an exemplary configuration for the burn-in prevention applied with the principal shown in FIG. 25.

FIG. 26 shows an exemplary configuration for burn-in prevention applied with the principal shown in FIG. 25. A modulation part 2601 offsets the display position of the presented image to swing the input image at the ultralow frequency. The image correction unit 202 uses the motion vector held in the motion vector holding part 1001 to give distortion in a direction opposite to the distortion generated in the eyepiece optical system 204 to the input image swinging at the ultralow frequency. After that, a reverse modulation part 2602 performs a modulation process in a direction opposite to that of the modulation part 2601 to cut out the display image from the input image and output via an XGA interface 2603 to the display unit 203. The display unit 203 has an orbit function to shift the display position (at the ultralow frequency) for burn-in prevention of the display panel.

Figure 27:
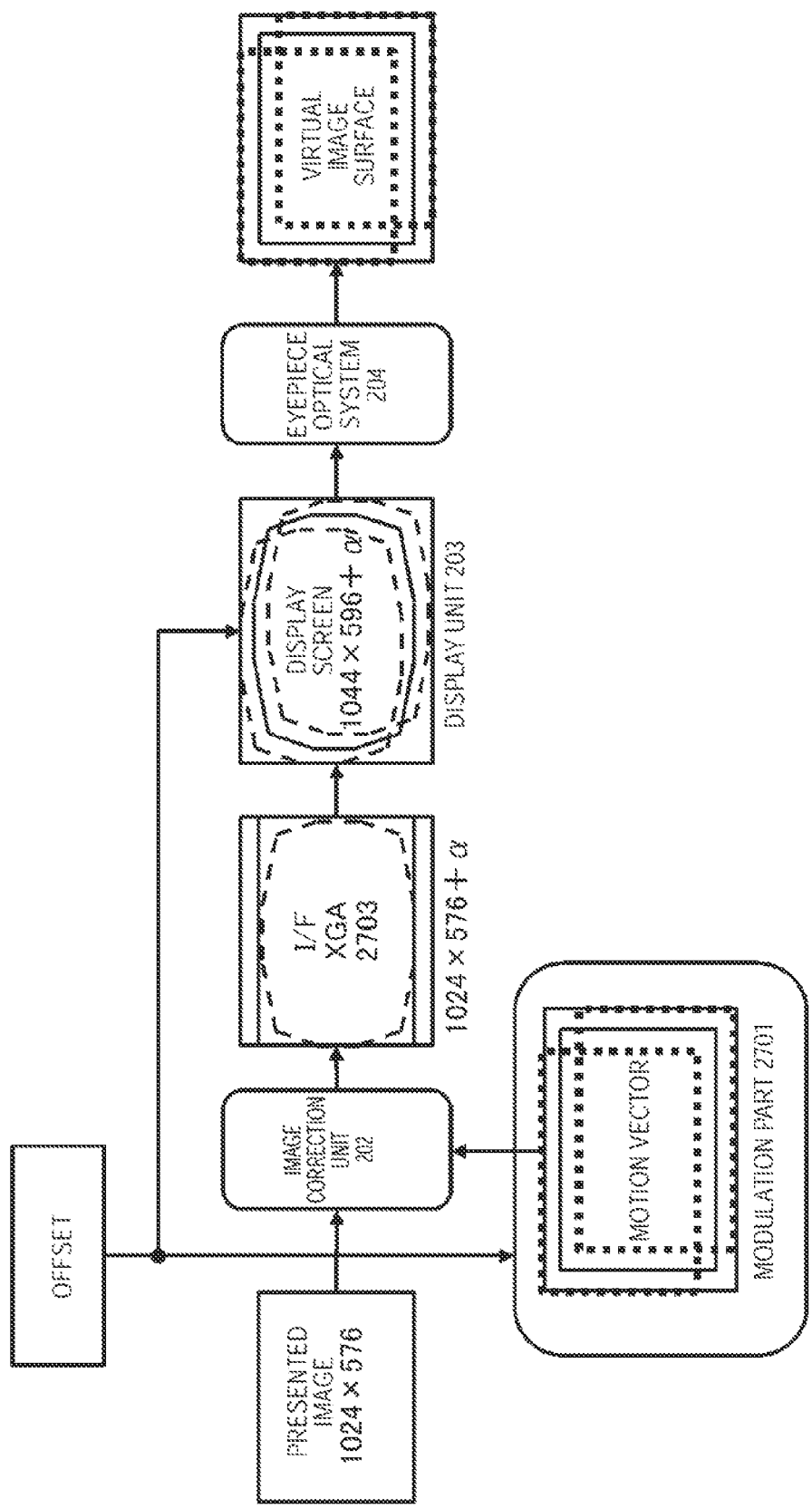
FIG. 27 is a diagram showing an exemplary implementation equivalent to that in FIG. 26.

FIG. 27 shows an exemplary implementation equivalent to that in FIG. 26. In the figure, a modulation part 2701 swings not the presented image but the motion vector (in the motion vector holding part 1001) at the ultralow frequency. In addition, an XGA interface 2703 determines the display scale in an acceptable range. When the position $p_a$ ($x_a$, $y_a$) of the display image is modulated, the motion vector is changed by the corresponding amount, and the maximum $d_v$ is found such that formula (19) below is met.

[Math 19]

$$x_{min}' \leq x_b \leq x_{max}'$$

$$y_{min}' \leq y_b \leq y_{max}' \qquad (19)$$

Figure 28:
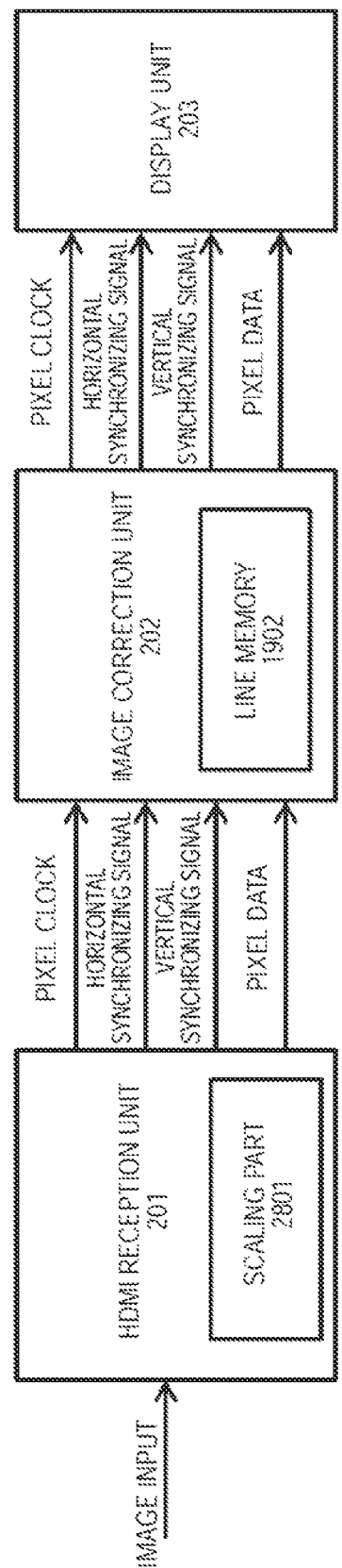
FIG. 28 is a functional block diagram illustrating correction by the signal process of distortion which is generated in a projection image of the eyepiece optical system 204.

FIG. 2 shows a functional block diagram illustrating correction by a signal process of distortion which is generated in the projection image of the eyepiece optical system 204. FIG. 19 shows an exemplary configuration in which the image correction unit 202 does not have a frame memory and the image correction is performed by only the line memory 1902. With taking into account device cost, a capacity of a line memory 1902 is desired to be restricted to be low. Therefore, as shown in FIG. 28, the HDMI reception unit 201 includes a scaling part 2801 performing a scaling process on an external input image in conformity to the number of pixels of the display screen of the display unit 203. The display unit 203 drives at a timing so as to make the size of line memory 1902 minimum.

Figure 29:
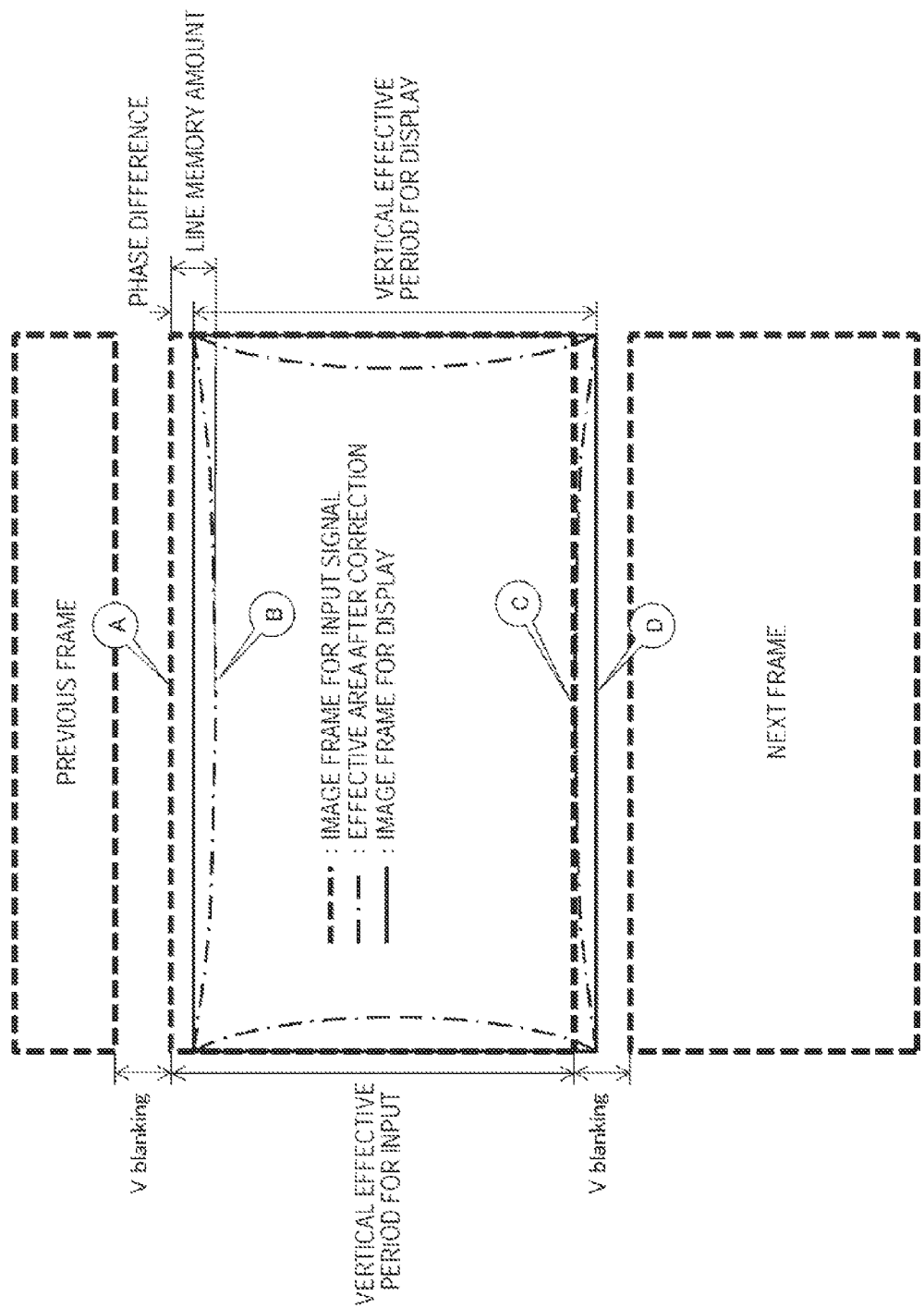
FIG. 29 is a diagram for explaining an estimation of a capacity of a line memory 1902 the image correction unit 202 has to have.
Figure 30:
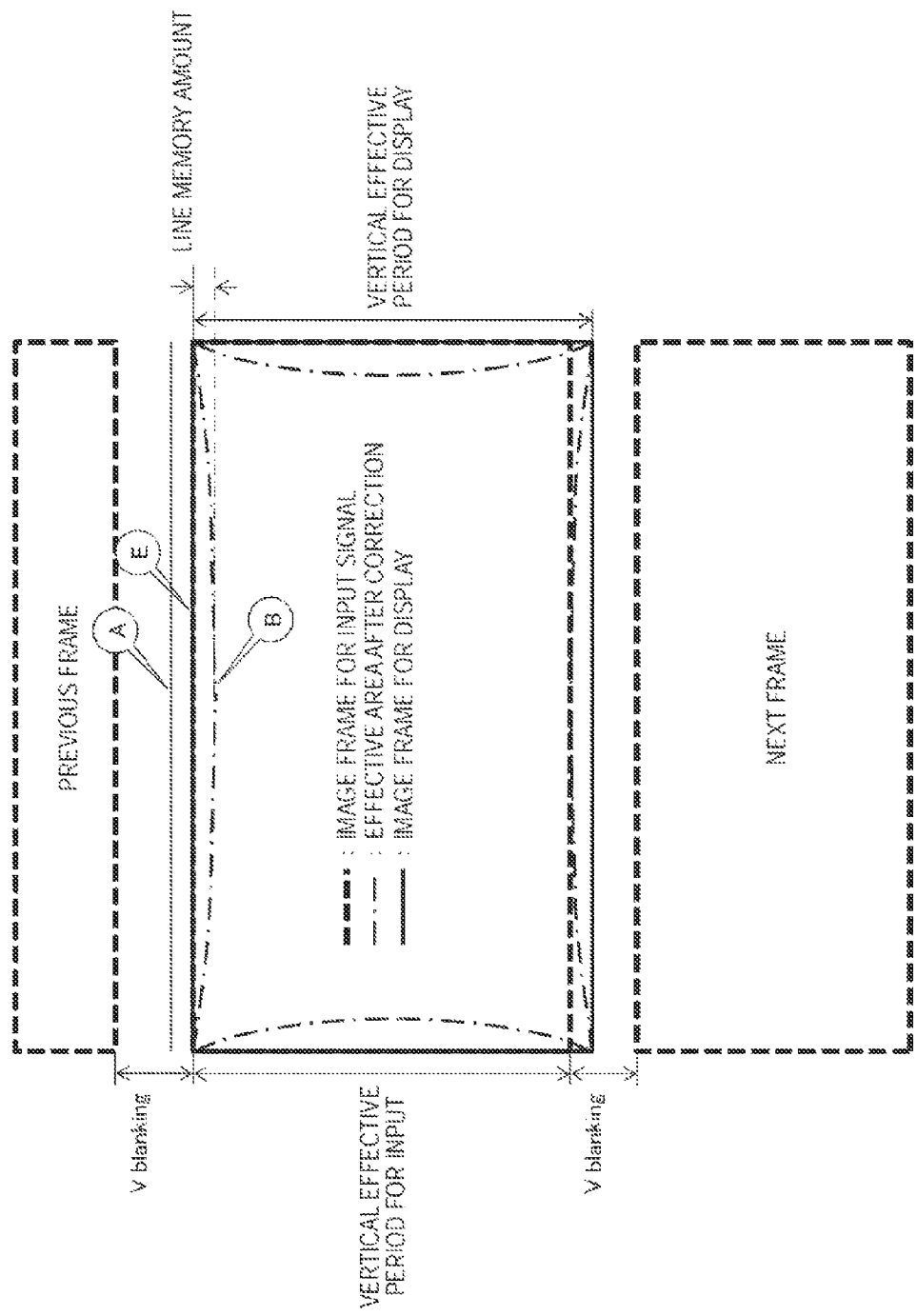
FIG. 30 is a diagram for explaining an estimation of a capacity of the line memory 1902 the image correction unit 202 has to have.

A description is given of an estimation of a capacity of the line memory 1902 the image correction unit 202 has to have with reference to FIG. 29 to FIG. 31.

Unless all the input of the image signal ends, a line denoted by C in FIG. 29 cannot be displayed. Therefore, phase difference of an amount of C-D is given in the vertical direction.

In FIG. 29, an initial input line denoted by A is used until a line denoted by B is displayed. Therefore, a capacity of a line memory 1902 of an amount of A-B is required in the vertical direction.

As shown in FIG. 30, if the image signal received by the HDMI reception unit 201 is reduced the scaling part 2801 and blanked until a time denoted E by in FIG. 30, a capacity of a line memory 1902 of an amount of E-B only is required.

Further, as shown in FIG. 31, if a timing for reading the image from the line memory 1902 to the display unit 203 is changed, and output is started from a time denoted by F in FIG. 31, a capacity of a line memory 1902 of an amount of A-F only is required.

Additionally, the present technology may also be configured as below.

(1)

A display device including:

an image display unit configured to display an image with a plurality of pixels arranged on a display surface;

an eyepiece optical unit configured to project the display surface of the image display unit in a manner that a predetermined angle of view is obtained; and an image correction unit configured to correct a display image on the display surface at a position of each of representative pixels which are discretely located on the display surface, on the basis of distortion generated due to the eyepiece optical unit.

(2)

The display device according to (1), wherein the image correction unit includes a motion vector holding part configured to hold a motion vector expressing the distortion generated due to the eyepiece optical unit at the position of the representative pixel, a vector interpolation part configured to interpolate a motion vector at a position of each pixel other than the representative pixel on the basis of the motion vectors of one or more representative pixels in the neighborhood, and a pixel correction part configured to provide, by use of the motion vector, distortion in a direction opposite to the distortion generated due to the eyepiece optical unit to each pixel on the display surface and to correct the pixel.

(3)

The display device according to (2), further including:

an optical simulator configured to trace a light ray of the display image in the image display unit passing through the eyepiece optical unit; and a vector generation part configured to generate the motion vector at the position of the representative pixel on the basis of light ray trace data obtained by the optical simulator.

(4)

The display device according to (2), further including:

a vector generation part generating the motion vector at the position of the representative pixel by actually shooting a virtual image projected by the eyepiece optical unit when the representative pixel is made to be lighted.

(5)

The display device according to (1), wherein the image display unit has the display surface vertically longer compared with an aspect ratio of the display image, the eyepiece optical unit generates a substantially pincushion shaped distortion, and the image correction unit corrects the display image in a manner that an angle of view at a horizontal end is not changed.

(6)

The display device according to (2), wherein the pixel correction part separates pixel correction in a vertical direction and pixel correction a horizontal direction and performs a pixel correction process in series for each direction.

(7)

The display device according to (2), wherein the pixel correction part moves the pixel in the same vertical line for each line to perform correction in a vertical direction and then subsequently moves the pixel in the same horizontal line for each line to perform correction in a horizontal direction.

(8)

The display device according to (7), wherein the pixel correction part finds the motion vector in the horizontal direction at a position moved by an amount of the motion vector in the vertical direction.

(9)

The display device according to (2), further including:

a modulation part configured to shift the position of the display image at low frequency, wherein the image correction unit corrects the display image having been subjected to a modulation process by the modulation part while shifting a correspondence relationship a pixel position and the motion vector, the image display unit has a function to shift a display position for burn-in prevention, and the shift of the image correction unit and the shift of the image display unit are made to operate in conjunction with each other.

(10)

The display device according to (1), further including:

a scaling part configured to scale the display image in conformity to the number of pixels of the display surface of the image display unit, wherein the image correction unit corrects the display image on a line memory, and the image display unit drives at a timing for making a size of the line memory minimum.

(11)

An image processing device including:

a motion vector holding part configured to hold a motion vector expressing distortion generated when an eyepiece optical unit projects a display surface in a manner that a predetermined angle of view is obtained, at a position of each of representative pixels which are discretely located on the display surface having a plurality of pixels arranged thereon;

a vector interpolation part configured to interpolate a motion vector at a position of each pixel other than the representative pixel on the basis of the motion vectors of one or more representative pixels in the neighborhood; and a pixel correction part configured to provide, by use of the motion vector, distortion in a direction opposite to the distortion generated due to the eyepiece optical unit to each pixel on the display surface and to correct the pixel.

(12)

An image processing method including:

a motion vector holding step of holding a motion vector expressing distortion generated when an eyepiece optical unit projects a display surface in a manner that a predetermined angle of view is obtained, at a position of each of representative pixels which are discretely located on the display surface having a plurality of pixels arranged thereon;

a vector interpolation step of interpolating a motion vector at a position of each pixel other than the representative pixel on the basis of the motion vectors of one or more representative pixels in the neighborhood; and a pixel correction step of providing, by use of the motion vector, distortion in a direction opposite to the distortion generated due to the eyepiece optical unit to each pixel on the display surface and of correcting the pixel.

(13)

A computer program described in a computer-readable form, the computer program causing a computer to function as:

an image display unit configured to display an image with a plurality of pixels arranged on a display surface;

an eyepiece optical unit configured to project the display surface of the image display unit in a manner that a predetermined angle of view is obtained; and an image correction unit configured to correct a display image on the display surface at a position of each of representative pixels which are discretely located on the display surface, on the basis of distortion generated due to the eyepiece optical unit.

INDUSTRIAL APPLICABILITY

Hereinabove, the technology disclosed in the present specification has been described in detail with reference to the specific embodiment. However, it is obvious that a person skilled in the art may find various alternations and modifications within the scope of the appended claims.

In the present specification, although the embodiment in which the technology disclosed in the present specification is applied to a head-mount display has been mainly described, the scope of the technology disclosed in the present specification is not limited to a configuration of a specific head-mount display. The technology disclosed in the present specification can be applied in the same manner to various types of display systems in which displayed images are presented to users through an eyepiece optical system.

In short, the technology disclosed in the present specification has been described in the form of exemplification, which does not limit the interpretation of the disclosed content of the present specification. When the gist of the technology disclosed in the present specification is determined, claims thereof should be considered.

REFERENCE SIGNS LIST 10 head-mount unit
20 Blu-ray disc reproduction device
30 high-vision display
40 front-end box
201 HDMI reception unit
202 image correction unit
203 display unit
204 eyepiece optical system
1001 motion vector holding part
1002 vector interpolation part
1003 pixel correction part
1401 optical simulator
1402 vector generation part

The invention claimed is:

1. A display device comprising:
an image display unit configured to display an image with a plurality of pixels arranged on a display surface;
an eyepiece optical unit configured to project the display surface of the image display unit in a manner that a predetermined angle of view is obtained; and
an image correction unit configured to correct a display image on the display surface at a position of each of representative pixels which are discretely located on the display surface, on the basis of distortion generated due to the eyepiece optical unit,
wherein the image correction unit includes
a motion vector holding part configured to hold a motion vector expressing the distortion generated due to the eyepiece optical unit at the position of the representative pixel,
a vector interpolation part configured to interpolate a motion vector at a position of each pixel other than the representative pixel on the basis of the motion vectors of one or more representative pixels in the neighborhood, and
a pixel correction part configured to provide, by use of the motion vector, distortion in a direction opposite to the distortion generated due to the eyepiece optical unit to each pixel on the display surface and to correct the pixel.

2. The display device according to claim 1, further comprising:
an optical simulator configured to trace a light ray of the display image in the image display unit passing through the eyepiece optical unit; and
a vector generation part configured to generate the motion vector at the position of the representative pixel on the basis of light ray trace data obtained by the optical simulator.

3. The display device according to claim 1, further comprising:
a vector generation part generating the motion vector at the position of the representative pixel by actually shooting a virtual image projected by the eyepiece optical unit when the representative pixel is made to be lighted.

4. The display device according to claim 1, wherein
the image display unit has the display surface vertically longer compared with an aspect ratio of the display image,
the eyepiece optical unit generates a substantially pincushion shaped distortion, and
the image correction unit corrects the display image in a manner that an angle of view at a horizontal end is not changed.

5. The display device according to claim 1, wherein
the pixel correction part separates pixel correction in a vertical direction and pixel correction a horizontal direction and performs a pixel correction process in series for each direction.

6. The display device according to claim 1, wherein
the pixel correction part moves the pixel in the same vertical line for each line to perform correction in a vertical direction and then subsequently moves the pixel in the same horizontal line for each line to perform correction in a horizontal direction.

7. The display device according to claim 6, wherein the pixel correction part finds the motion vector in the horizontal direction at a position moved by an amount of the motion vector in the vertical direction.

8. The display device according to claim 1, further comprising:
a modulation part configured to shift the position of the display image at low frequency,
wherein
the image correction unit corrects the display image having been subjected to a modulation process by the modulation part while shifting a correspondence relationship a pixel position and the motion vector,
the image display unit has a function to shift a display position for burn-in prevention, and
the shift of the image correction unit and the shift of the image display unit are made to operate in conjunction with each other.

9. The display device according to claim 1, further comprising:
a scaling part configured to scale the display image in conformity to the number of pixels of the display surface of the image display unit,
wherein
the image correction unit corrects the display image on a line memory, and
the image display unit drives at a timing for making a size of the line memory minimum.

10. A non-transitory computer-readable medium having stored thereon a program for causing a display device to perform a correction method,
in which said display device includes an image display unit configured to display an image with a plurality of pixels arranged on a display surface and an eyepiece optical unit configured to project the display surface of the image display unit in a manner that a predetermined angle of view is obtained,
said method comprising:
correcting a display image on the display surface at a position of each of representative pixels which are discretely located on the display surface, on the basis of distortion generated due to the eyepiece optical unit,
in which the correcting includes
holding a motion vector expressing the distortion generated due to the eyepiece optical unit at the position of the representative pixel,
interpolating a motion vector at a position of each pixel other than the representative pixel on the basis of the motion vectors of one or more representative pixels in the neighborhood, and
providing, by use of the motion vector, distortion in a direction opposite to the distortion generated due to the eyepiece optical unit to each pixel on the display surface and to correct the pixel.

* * * * *